United States Patent
Spies et al.

(10) Patent No.: US 8,958,562 B2
(45) Date of Patent: *Feb. 17, 2015

(54) FORMAT-PRESERVING CRYPTOGRAPHIC SYSTEMS

(75) Inventors: Terence Spies, San Mateo, CA (US); Matthew J. Pauker, San Francisco, CA (US)

(73) Assignee: Voltage Security, Inc., Cupertino, CA (US)

(*) Notice: Subject to any disclaimer, the term of this patent is extended or adjusted under 35 U.S.C. 154(b) by 1963 days.

This patent is subject to a terminal disclaimer.

(21) Appl. No.: 11/654,054

(22) Filed: Jan. 16, 2007

(65) Prior Publication Data

US 2008/0170693 A1  Jul. 17, 2008

(51) Int. Cl.
*H04L 9/08* (2006.01)
*H04L 9/32* (2006.01)
(Continued)

(52) U.S. Cl.
CPC .......... *G06Q 20/3829* (2013.01); *H04L 9/0869* (2013.01); *H04L 9/0866* (2013.01);
(Continued)

(58) Field of Classification Search
CPC ....... H04L 9/08; H04L 9/0816; H04L 9/0819; H04L 9/083; H04L 9/0861; H04L 9/0866; H04L 9/0869; H04L 9/32; H04L 9/321; H04L 63/08; H04L 63/20; H04L 2209/56; G06F 21/6245; G06Q 20/3829
USPC ............ 709/227, 228; 705/39, 75, 64, 76, 71; 380/201, 28, 277–279, 44; 726/28, 3, 726/5, 7, 1; 713/155, 168
See application file for complete search history.

(56) References Cited

U.S. PATENT DOCUMENTS 5,727,065 A * 3/1998 Dillon ............................ 705/52
5,784,461 A * 7/1998 Shaffer et al. ................ 705/51
(Continued)

FOREIGN PATENT DOCUMENTS

EP   1 209 550 A2   5/2002
WO   WO 02/51066 A1   6/2002
(Continued)

OTHER PUBLICATIONS

T, Lookabaugh; Security analysis of selectively encrypted MPEG-2 streams; Year 2003; colorado.edu; pp. 1-12.*
(Continued)

*Primary Examiner* — Zachary A Davis
(74) *Attorney, Agent, or Firm* — Treyz Law Group; G. Victor Treyz; Michael H. Lyons

(57) ABSTRACT

Key requests in a data processing system may include identifiers such as user names, policy names, and application names. The identifiers may also include validity period information indicating when corresponding keys are valid. When fulfilling a key request, a key server may use identifier information from the key request in determining which key access policies to apply and may use the identifier in determining whether an applicable policy has been satisfied. When a key request is authorized, the key server may generate a key by applying a one-way function to a root secret and the identifier. Validity period information for use by a decryption engine may be embedded in data items that include redundant information. Application testing can be facilitated by populating a test database with data that has been encrypted using a format-preserving encryption algorithm. Parts of a data string may be selectively encrypted based on their sensitivity.

17 Claims, 16 Drawing Sheets

(51) Int. Cl.
*G06Q 20/00* (2012.01)
*G06Q 20/38* (2012.01)
*G06F 21/62* (2013.01)
*G06F 21/60* (2013.01)

(52) U.S. Cl.
CPC ........ *G06F21/6209* (2013.01); *G06F 21/6227* (2013.01); *G06F 21/6245* (2013.01); *H04L 9/083* (2013.01); *H04L 9/321* (2013.01); *G06F 21/602* (2013.01)
USPC ................ 380/279; 380/46; 713/168; 726/7; 726/1; 705/71

(56) References Cited

U.S. PATENT DOCUMENTS

| | | | | |
|---|---|---|---|---|
| 6,182,216 | B1 | 1/2001 | Luyster | |
| 6,230,269 | B1* | 5/2001 | Spies et al. | 713/182 |
| 6,263,439 | B1* | 7/2001 | Hondros et al. | 713/182 |
| 6,289,450 | B1* | 9/2001 | Pensak et al. | 713/167 |
| 6,836,765 | B1* | 12/2004 | Sussman | 705/75 |
| 6,885,748 | B1* | 4/2005 | Wang | 380/201 |
| 7,337,176 | B1* | 2/2008 | Cheedella et al. | 1/1 |
| 7,353,388 | B1* | 4/2008 | Gilman et al. | 713/168 |
| 7,401,232 | B2* | 7/2008 | Ono et al. | 713/193 |
| 7,412,519 | B2* | 8/2008 | Wang | 709/227 |
| 7,418,098 | B1* | 8/2008 | Mattsson et al. | 380/28 |
| 7,522,723 | B1* | 4/2009 | Shaik | 380/30 |
| 7,580,919 | B1* | 8/2009 | Hannel et al. | 1/1 |
| 7,624,269 | B2* | 11/2009 | Appenzeller et al. | 713/171 |
| 7,657,037 | B2* | 2/2010 | Callas | 380/284 |
| 7,748,030 | B1* | 6/2010 | Selberg et al. | 726/7 |
| 8,000,474 | B1* | 8/2011 | Evans et al. | 380/205 |
| 8,001,585 | B2* | 8/2011 | Hogan et al. | 726/6 |
| 8,028,169 | B2* | 9/2011 | Yoshioka | 713/176 |
| 8,364,951 | B2* | 1/2013 | Peterka et al. | 713/155 |
| 2002/0073202 | A1* | 6/2002 | Wang | 709/227 |
| 2003/0028481 | A1* | 2/2003 | Flitcroft et al. | 705/39 |
| 2003/0191719 | A1 | 10/2003 | Ginter et al. | |
| 2005/0132070 | A1* | 6/2005 | Redlich et al. | 709/228 |
| 2005/0262573 | A1* | 11/2005 | Bo et al. | 726/27 |
| 2006/0031923 | A1* | 2/2006 | Kanai | 726/1 |
| 2006/0059149 | A1 | 3/2006 | Dunki et al. | |
| 2009/0310778 | A1 | 12/2009 | Mueller et al. | |
| 2010/0111297 | A1 | 5/2010 | Pauker et al. | |

FOREIGN PATENT DOCUMENTS

| | | |
|---|---|---|
| WO | WO 03/001326 A2 | 1/2003 |
| WO | 2006/107777 | 10/2006 |

OTHER PUBLICATIONS

Naor et al. "On the Construction of Pseudorandom Permutations: Luby-Rackoff Revisited". Journal of Cryptology, vol. 12, Issue 1, pp. 29-66. Jan. 1999.*
U.S. Appl. No. 11/635,756, filed Dec. 6, 2006.
J. Black et al. "Ciphers with Arbitrary Finite Domains", RSA Conference 2002, San Jose, CA, USA, Feb. 18-22, 2002, Proceedings, Lecture Notes in Computer Science, 2271 Springer 2002, ISBN 3-540-43224, pp. 114-130.
Martin, Luther W. et al. U.S. Appl. No. 12/610,221, filed Oct. 30, 2009.
Thomas Stutz and Andreas Uhl, "On Format-Compliant Iterative Encryption of JPEG2000," Proceedings of the Eighth IEEE International Symposium on Multimedia (ISM '06), 2006.
J. Black and P. Rogaway, "Ciphers with Arbitrary Finite Domains," [online]. Feb. 12, 2001 <URL:eprint.iacr.org/2001/012.ps>.
Pauker, Matthew J. U.S. Appl. No. 12/432,258, filed Apr. 29, 2009.
Burnett, Steven D. U.S. Appl. No. 12/435,635, filed May 5, 2009.
Brightwell, M et al. "Using Datatype-Preserving Encryption to Enhance Data Warehouse Security", 20th National Information Systems Security Conference, Oct. 7-10, 1997—Baltimore, Maryland.
U.S. Department of Commerce/National Institute of Standards and Technology, "Data Encryption Standard (DES)", Oct. 25, 1999, Federal Information Processing Standards Publication.
T. Lookabaugh; Security analysis of selectively encrypted MPEG-2 streams; Tear 2003; colorado.edu; pp. 1-12.
Liskov et al., "Tweakable Block Ciphers" CRYPTO 2002 [online] [retrieved on Jun. 29, 2010] <URL:http://www.cs.wm.edu/~milskov/pubs/lirwa053102.pdf>.

* cited by examiner

FORMAT-PRESERVING CRYPTOGRAPHIC SYSTEMS

BACKGROUND OF THE INVENTION

This invention relates to cryptography and more particularly, to preserving data formats during encryption and decryption operations.

Cryptographic systems are used to secure data in a variety of contexts. For example, encryption algorithms are used to encrypt sensitive information such as financial account numbers, social security numbers, and other personal information. By encrypting sensitive data prior to transmission over a communications network, the sensitive data is secured, even if it passes over an unsecured communications channel. Sensitive data is also sometimes encrypted prior to storage in a database. This helps to prevent unauthorized access to the sensitive data by an intruder.

Commonly used encryption algorithms include the Advanced Encryption Standard (AES) encryption algorithm and the Data Encryption Standard (DES) encryption algorithm. Using these types of algorithms, an organization that desires to secure a large quantity of sensitive information can place the sensitive information in a data file. The data file can then be encrypted in its entirety using the AES or DES algorithms.

Encrypting entire files of data can be an effective technique for securing large quantities of data. However, bulk encryption of files can be inefficient and cumbersome because it is not possible to selectively access a portion of the encrypted data in an encrypted file. Even if an application only needs to have access to a portion of the data, the entire file must be decrypted. Without the ability to selectively decrypt part of a file, it can be difficult to design a data processing system that provides different levels of data access for different application programs and for different personnel.

To avoid the difficulties associated with encrypting entire files of sensitive data, it would be desirable to be able to apply cryptographic techniques such as the AES and DES encryption algorithms with a finer degree of granularity. For example, it might be desirable to individually encrypt social security numbers in a database table, rather than encrypting the entire table. This would allow software applications that need to access unsensitive information in the table to retrieve the desired information without decrypting the entire table.

Conventional encryption techniques can, however, significantly alter the format of a data item. For example, encryption of a numeric string such as a credit card number may produce a string that contains non-numeric characters or a string with a different number of characters. Because the format of the string is altered by the encryption process, it may not be possible to store the encrypted string in the same type of database table that is used to store unencrypted versions of the string. The altered format of the encrypted string may therefore disrupt software applications that need to access the string from a database. The altered format may also create problems when passing the encrypted string between applications. Because of these compatibility problems, organizations may be unable to incorporate cryptographic capabilities into legacy data processing systems.

It would therefore be desirable to be able to provide cryptographic tools that are capable of encrypting and decrypting data without altering the format of the data.

SUMMARY OF THE INVENTION

In accordance with the present invention, a data processing system is provided in which a format-preserving cryptographic function may be used for format-preserving encryption operations and format-preserving decryption operations. The data processing system may include a key server. The key server may provide cryptographic keys to authorized key requesters. The key server may use policy rules to determine which key requesters are authorized to obtain a copy of a given key. If a key requester is authorized, the key server may generate the requested key and may provide the key to the key requester over a communications network.

Key requests may include identifiers. Identifiers help to identify key requesters and key requests. Suitable identifiers may include user names such as the name of an individual, the name of an organization, the name of a group, etc. Policy names and program names may also be used as identifiers.

If desired, key validity period information may be included in an identifier. With one suitable arrangement, data to be encrypted or decrypted using a key is credit card data and the validity period information is a credit card expiration date.

Using a format-preserving encryption function, plaintext may be encrypted to form ciphertext. Validity period information may be embedded in the ciphertext for use in requesting and generating an appropriate decryption key. The validity period information may be embedded by combining an index value that corresponds to a particular validity period with redundant information such as a checksum value in a credit card number. Upon receipt of the ciphertext containing the embedded validity period information, an application can extract the embedded validity period information. The extracted validity period information can be used in selecting an appropriate key to use in responding to the key request, so information such as the validity period information may sometimes be referred to as key selector information or a key selector.

In a data processing system including multiple applications that access a common database, testing can be facilitated by using a format-preserving encryption engine to encrypt sensitive data prior to testing. In a normal production environment for the data processing system, multiple applications access a production database that contains sensitive data. Proper testing of applications in a test environment requires that the format of the data be preserved. The format-preserving encryption engine is used to encrypt the sensitive items in the production database. The encrypted versions of the sensitive data items are then exported into a test version of the database. The applications can be tested using the encrypted data in the test database.

A plaintext string may include multiple plaintext parts. Each plaintext part may have a different sensitivity level. In this type of situation, it may be desirable to provide access to different parts of the plaintext to different applications or entities. By selectively encrypting each plaintext part, access can be controlled. Encryption keys for encrypting each part can be formed using the results of earlier encryption operations. In this way, a second plaintext part may be randomized relative to a first plaintext part during encryption, a third plaintext part may be randomized relative to the second plaintext part during encryption, etc.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
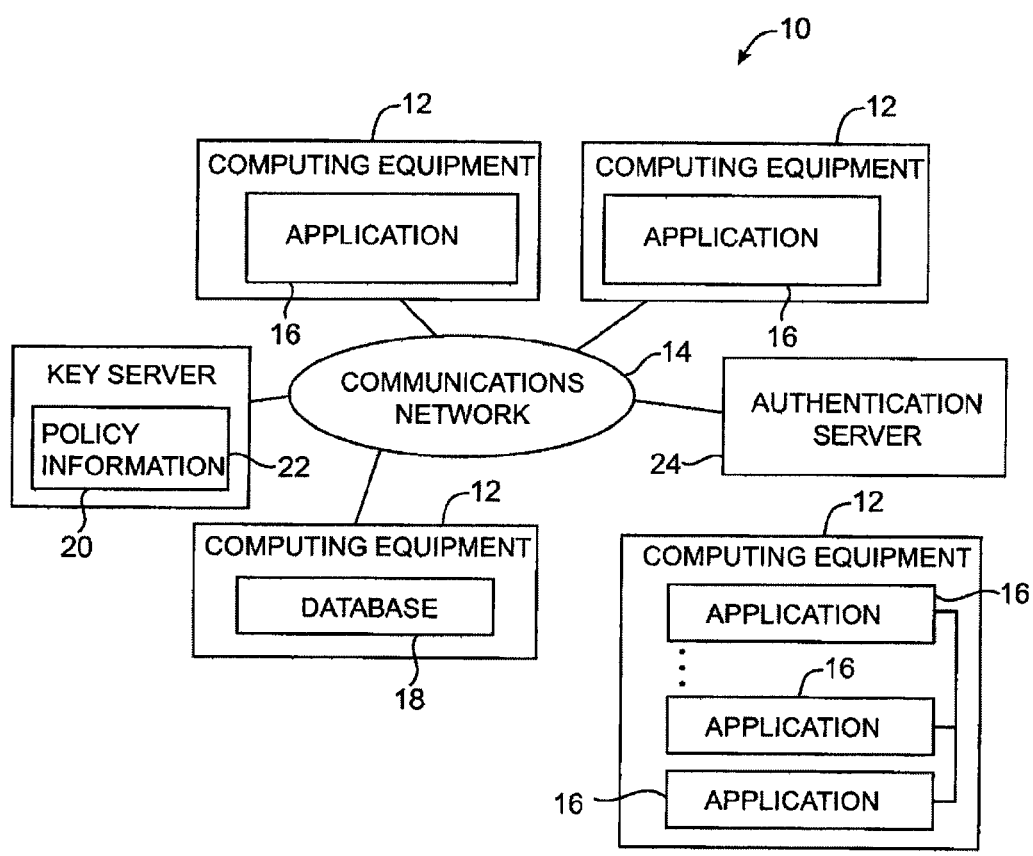
FIG. 1 is a diagram of an illustrative system environment in which cryptographic tools with format-preserving encryption

An illustrative cryptographic system 10 in accordance with the present invention is shown in FIG. 1. System 10 includes computing equipment 12 and communications network 14. The computing equipment 12 may include one or more personal computers, workstations, computers configured as servers, mainframe computers, portable computers, etc. The communications network 14 may be a local area network or a wide area network such as the internet. System 10 may be used in processing data for one or more organizations.

Computing equipment 12 may be used to support applications 16 and databases 18. In computing equipment 12 in which multiple applications run on the same computer platform, applications and databases may communicate with each other directly. If desired, applications 16 can communicate with each other and with databases 18 remotely using communications network 14. For example, an application 16 that is run on a computer in one country may access a database 18 that is located in another country or an application 16 running on one computer may use network 14 to transmit data to an application 16 that is running on another computer. Applications 16 may be any suitable applications, such as financial services applications, governmental record management applications, etc.

The data that is handled by system 10 includes sensitive items such as individuals' addresses, social security numbers and other identification numbers, license plate numbers, passport numbers, financial account numbers such as credit card and bank account numbers, telephone numbers, email addresses, etc. In some contexts, information such as individuals' names may be considered sensitive.

In a typical scenario, a credit card company maintains a database 18 of account holders. The database lists each account holder's name, address, credit card number, and other account information. Representatives of the credit card company may be located in many different geographic locations. The representatives may use various applications 16 to access the database. For example, a sales associate may retrieve telephone numbers of account holders to make sales calls using one application, whereas a customer service representative may retrieve account balance information using another application. Automated applications such as error-checking housekeeping applications may also require access to the database.

To prevent unauthorized access to sensitive data and to comply with data privacy regulations and other restrictions, sensitive data may need to be encrypted. Encryption operations may be performed before data is passed between applications 16 or before data is stored in a database 18. Because various applications may need to access different types of data, the system 10 preferably allows data to be selectively encrypted. As an example, each of the telephone numbers and each of the credit card numbers can be individually encrypted using separate cryptographic keys. With this type of selective encryption arrangement, applications that require access to telephone numbers need not be provided with access to credit card numbers and vice versa.

To support encryption and decryption operations in system 10 applications 16 may be provided with encryption and decryption engines. For example, an application 16 that accesses a database 18 over a communications network 14 may have an encryption engine for encrypting sensitive data before it is provided to the database 18 and stored and may have a decryption engine for use in decrypting encrypted data that has been retrieved from database 18 over communications network 14. As another example, a first application may have an encryption engine for encrypting sensitive data before passing the encrypted data to a second application. The second application may have a decryption engine for decrypting the encrypted data that has been received from the first application.

Any suitable technique may be used to provide applications 16 with encryption and decryption capabilities. For example, the encryption and decryption engines may be incorporated into the software code of the applications 16, may be provided as stand-alone applications that are invoked from within a calling application, or may be implemented using a distributed arrangement in which engine components are distributed across multiple applications and/or locations.

Key server 20 may be used to generate and store cryptographic keys that are used by the encryption and decryption engines. Key server 20 may include policy information 22 that key server 20 uses in determining whether to fulfill key requests. As an example, policy information 22 may include a set of policy rules that dictate that keys should only be released if they have not expired and if the key requester's authentication credentials are valid.

In a typical scenario, an application requests a key from key server 22. When requesting the key, the application provides authentication credentials to the key server 20. The key server 20 provides the authentication credentials to authentication server 24. Authentication server 24 verifies the authentication credentials and provides the results of the verification operation to the key server over communications network 14. If the key requester is successfully authenticated and if the key server determines that the expiration period has not yet expired, the key server can satisfy the key request by providing the requested key to the application over a secure path in network 14 (e.g., over a secure sockets layer link). Other authentication techniques and key request arrangements may be used if desired.

Figure 2:
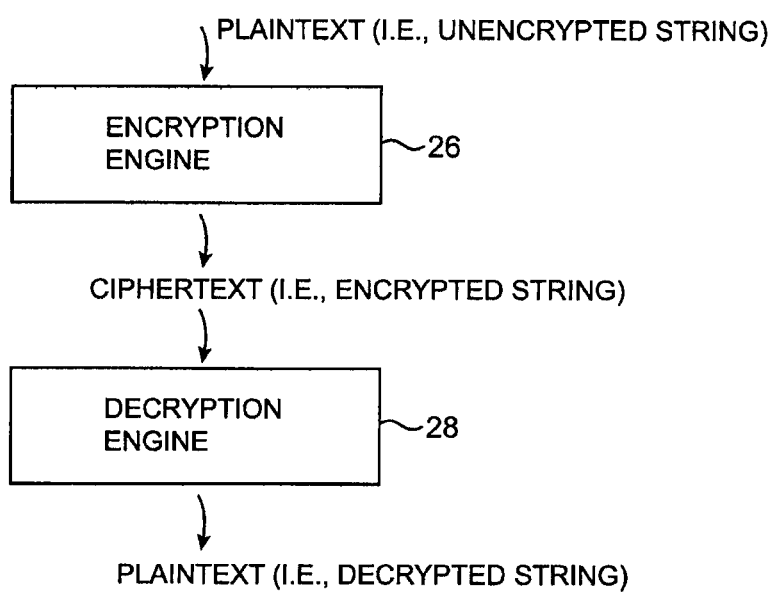
FIG. 2 is a diagram showing how encryption and decryption engines preserve the format of a string in accordance with an embodiment of the present invention.

The data handled by the applications 16 and databases 18 of system 10 is represented digitally. The data includes strings of characters (e.g., names, addresses, account numbers, etc.). As shown in FIG. 2, during encryption operations, an encryption engine 26 encrypts unencrypted strings of characters (sometimes referred to as plaintext) into encrypted strings of characters (sometimes referred to as ciphertext). During decryption operations, a decryption engine 28 decrypts encrypted strings of characters to form unencrypted strings of characters.

The data strings that are handled in a typical data processing system have defined formats. For example, an identification number may be made up of three letters followed by ten digits. The encryption and decryption engines of the present invention are able to encrypt and decrypt strings without changing a string's format (i.e., so that a plaintext identification number made up of three letters followed by ten digits would be encrypted to form corresponding ciphertext make up of three letters and ten digits). The ability to preserve the format of a data string greatly simplifies system operations and allows systems with legacy applications to be provided with cryptographic capabilities that would not be possible using conventional techniques.

Conventional encryption algorithms can alter the format of a string during encryption, so that it becomes difficult or impossible to use the encrypted version of the string. For example, it may be impossible to store a conventionally-encrypted credit card number in a database table that has been designed to handle strings that contain only digits.

In accordance with the present invention, data strings can be encrypted and decrypted while preserving the format of the strings. Consider, as an example, the encryption and decryption of credit card numbers. Credit card numbers generally have between 13 and 18 digits. The format for a particular valid credit card number might require that the credit card number have 16 digits. This type of credit card number will be described as an example.

In a 16-digit credit card number, the digits are typically organized in four groups of four each, separated by three spaces. During a format-preserving encryption operation, an unencrypted credit card number such as "4408 0412 3456 7890" may be transformed into credit-card-formatted ciphertext such as "4417 1234 5678 9114" and during decryption, the ciphertext "4417 1234 5678 9114" may be transformed back into the unencrypted credit card number "4408 0412 3456 7890".

The value of a valid sixteenth digit in a credit card number is formed by performing a checksum operation on the first 15 digits using the so-called Luhn algorithm. Any single-digit error in the credit card number and most adjacent digit transpositions in the credit card number will alter the checksum value, so that data entry errors can be identified.

During encryption operations, the encryption engine 26 can compute a new checksum value using the first 15 digits of the ciphertext. The new checksum digit can be used in the ciphertext or, if desired, policy information such as a validity period may be embedded within the checksum digit by adding an appropriate validity period index value to the new checksum value. When a validity period is embedded within a checksum digit, the resulting modified checksum value will generally no longer represent a valid checksum for the string. However, applications in system 10 will be able to retrieve the validity period information from the checksum digit and will be able to use the extracted validity period information in obtaining a decryption key from key server 20 (FIG. 1).

This type of embedding operation may be used to store any suitable information within encrypted data. The use of credit card numbers, and, more particularly, the use of validity period information that has been embedded within the checksum digits of credit card numbers are described herein as examples.

Because encryption and decryption engines 26 and 28 of FIG. 2 can preserve a desired format for a string during encryption and decryption operations, sensitive data can be secured without requiring entire files to be encrypted.

The encryption and decryption engines 26 and 28 preferably use index mappings to relate possible character values in a given string position to corresponding index values in an index. By mapping string characters to and from a corresponding index, the encryption and decryption engines 26 and 28 are able to perform encryption and decryption while preserving string formatting.

In a typical scenario, an index mapping may be formed using a table having two columns and a number of rows. The first column of the mapping corresponds to the potential character values in a given string position (i.e., the range of legal values for characters in that position). The second column of the mapping corresponds to an associated index. Each row in the mapping defines an association between a character value and a corresponding index value.

Consider, as an example, a situation in which the string being encrypted has first, fifth, sixth, and seventh string characters that are digits and second, third, and fourth characters that are uppercase letters. In this situation, the possible character values in the first, fifth, sixth, and seventh character positions within the plaintext version of the string might range from 0 to 9 (i.e., the first character in the string may be any digit from 0 through 9, the fifth character in the string may be any digit from 0 to 9, etc.). The possible character values in the second, third, and fourth positions in the string range from A to Z (i.e., the second character in the unencrypted version of the string may be any uppercase letter in the alphabet from A to Z, the third character in the unencrypted version of the string may be any uppercase letter from A through Z, etc.).

The index mapping in this type of situation may map the ten possible digit values for the first, fifth, sixth, and seventh string characters into ten corresponding index values (0 . . . 9). For the second, third, and fourth character positions, 26 possible uppercase letter values (A . . . Z) may be mapped to 26 corresponding index values (0 . . . 25).

In a typical string, not all characters have the same range of potential character values. If there are two ranges of potential character values, two index mappings may be used, each of which maps a different set of possible character values to a different set of index values. If there are three ranges of potential character values within the string, three index mappings may be used. For example, a first index mapping may relate a digit character to a first index, a second index mapping may relate a uppercase letter character to a second index, and a third index mapping may relate an alphanumeric character to a third index. In strings that contain a larger number of different character types, more index mappings may be used.

In general, a string contains a number of characters N. The potential character values in the string are related to corresponding index values using index mappings. An index mapping is created for each character. The indexes used to represent each character may have any suitable size. For example, an index containing 52 index values may be associated with string characters with character values that span both the uppercase and lowercase letters. Because not all of the characters typically have the same range of potential character values, there are generally at least two different index mappings used to map character values in the string to corresponding index values. In a string with N characters, N index mappings are used, up to N of which may be different index mappings.

Any suitable cryptographic formulation may be used for the format-preserving encryption and decryption engines 26 and 28, provided that the cryptographic strength of the encryption algorithm is sufficiently strong. With one suitable approach, encryption engine 26 and decryption engine 28 use a cryptographic algorithm based on the well known Luby-Rackoff construction. The Luby-Rackoff construction is a method of using pseudo-random functions to produce a pseudo-random permutation (also sometimes referred to as a block cipher). A diagram showing how encryption engine 26 and decryption engine 28 may be implemented using the Luby-Rackoff construction is shown in FIG. 3.

During encryption operations, an unencrypted string is divided into two portions. The unencrypted string may be divided into two portions using any suitable scheme. For example, the string may be divided into odd and even portions by selecting alternating characters from the string for the odd portion and for the even portion. With another suitable approach, the unencrypted string is divided into two portions by splitting the string into left and right halves.

Figure 3:
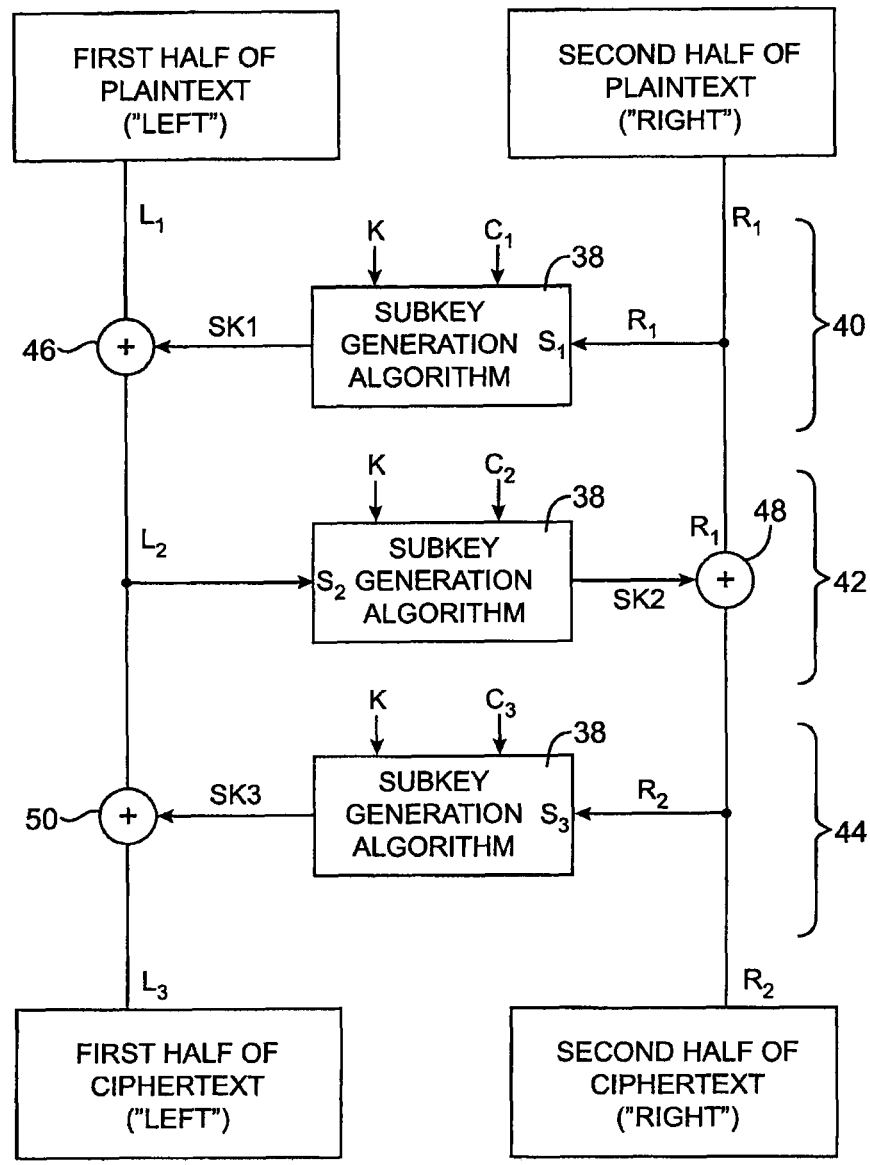
FIG. 3 is a diagram of an illustrative format-preserving block cipher that may be used during data encryption and decryption in accordance with an embodiment of the present invention.

In FIG. 3, the first half of the unencrypted string is labeled "$L_1$" and the second half of the unencrypted string is labeled "$R_1$". During encryption operations with encryption engine 26, the unencrypted string halves $L_1$ and $R_1$ are processed to form corresponding encrypted string halves $L_3$ and $R_2$. During decryption operations with decryption engine 28, processing flows from the bottom of FIG. 3 towards the top, so that encrypted string halves $L_3$ and $R_2$ are decrypted to produce unencrypted halves $L_1$ and $R_1$. Processing occurs in three rounds 40, 42, and 44. During encryption, the operations of round 40 are performed first, the operations of round 42 are performed second, and the operations of round 44 are performed third. During decryption, the operations of round 44 are performed first, the operations of round 42 are performed second, and the operations of round 40 are performed third.

Although shown as involving three rounds in the example of FIG. 3, the operations of FIG. 3 may, if desired, be implemented using four or more rounds. The use of a three-round block cipher is described as an example.

The block cipher structure of FIG. 3 encrypts (or decrypts) a string of a particular known size to produce an output string of the same size. The block cipher uses a subkey generation algorithm 38. The subkey generation algorithm 38 has three inputs: a key K, a constant C ($C_1$ for round 40, $C_2$ for round 42, and $C_3$ for round 44), and a string S ($S_1=R_1$ for round 40, $S_2=L_2$ for round 42, and $S_3=R_2$ for round 44).

The subkey generation algorithm 38 may be a function H' that is based on a cryptographic hash function H and that takes as an input S, C, and K. With one suitable approach, the subkey generation algorithm H' is given by equation 1.

$$H'=H(S|C|K) \quad (1)$$

In equation 1, the symbol "|" represents the concatenation function. The cryptographic hash function H is preferably chosen so that the subkey generation algorithm has a suitable cryptographic strength. Illustrative cryptographic hash functions that can be used for hash function H include the SHA1 hash function and the AES algorithm used as a hash function.

The value of the key K is the same for rounds 40, 42, and 44. The value of the constant C is different for each round. With one suitable arrangement, the constant $C_1$ that is used in round 40 is equal to 1, the constant $C_2$ that is used in round 42 is 2, and the constant $C_3$ that is used in round 44 is 3. The value of S varies in each round. In round 40, $S_1$ is equal to the first half of the unencrypted string $R_1$. In round 42, $S_2$ is equal to the $L_2$. In round 44, $S_3$ is equal to $R_2$.

In round 40, the output of the subkey generation algorithm is subkey SK1, as shown in equation 2.

$$SK1=H(S_1|C_1|K) \quad (2)$$

In round 42, the output of the subkey generation algorithm is subkey SK2, as shown in equation 3.

$$SK2=H(S_2|C_2''|K) \quad (3)$$

In round 44, the output of the subkey generation algorithm is subkey SK3, as shown in equation 4.

$$SK3=H(S_3|C_3|K) \quad (4)$$

Equations 1-4 involve the use of a cryptographic hash function for the subkey generation algorithm. If desired, the subkey generation algorithm may be implemented using a cryptographic message authentication code (MAC) function. A cryptographic message authentication code function is a keyed hash function. Using a cryptographic message authentication code function, equation 1 would become H'=MACF(S|C,K), where MACF is the message authentication code function. An example of a message authentication code function is CMAC (cipher-based MAC), which is a block-cipher-based message authentication code function. The cryptographic message authentication code function AES-CMAC is a CMAC function based on the 128-bit advanced encryption standard (AES).

A format-preserving combining operation (labeled "+" in FIG. 3) is used to combine the subkeys SK1, SK2, and SK3 with respective string portions.

During encryption operations, format-preserving combining operation 46 combines SK1 with string $L_1$ to produce string $L_2$. During decryption operations, format-preserving combining operation 46 combines SK1 with string $L_2$ to produce string $L_1$. Format-preserving combining operation 48 combines SK2 with string $R_1$ to produce string $R_2$ during encryption operations and combines SK2 with string $R_2$ to produce string $R_1$ during decryption operations. Format-preserving combining operation 50 is used to process subkey SK3. During encryption, format-preserving combining operation 50 combines SK3 with string $L_2$ to produce string $L_3$. During decryption, format-preserving combining operation 50 combines SK3 with string $L_3$ to produce string $L_2$.

The format-preserving combining operation + preserves the format of the strings $L_1$, $L_2$, $L_3$, $R_1$, and $R_2$ as they are combined with the subkeys SK1, SK2, and SK3. For example, the string $L_2$ that is produced by combining string $L_1$ and subkey SK1 has the same format as the string $L_1$.

The format-preserving combining operation + may be based on any suitable mathematical combining operation. For example, the function + may be addition mod x or the function + may be multiplication mod x, where x is an integer of an appropriate size (i.e., $x=y^z$, where z is equal to the length of the string S, and where y is equal to the number of possible character values for each character in the string S). If, as an example, the string S contains 16 digits (each digit having one of 10 possible values from 0 to 9), x would be $10^{16}$. If the string S contains three uppercase letters (each uppercase letter having one of 26 possible values from A to Z), x would be $26^3$. These are merely illustrative examples. The format-preserving combining function + may be any reversible logical or arithmetic operation that preserves the format of its string input when combined with the subkey.

Figure 4:
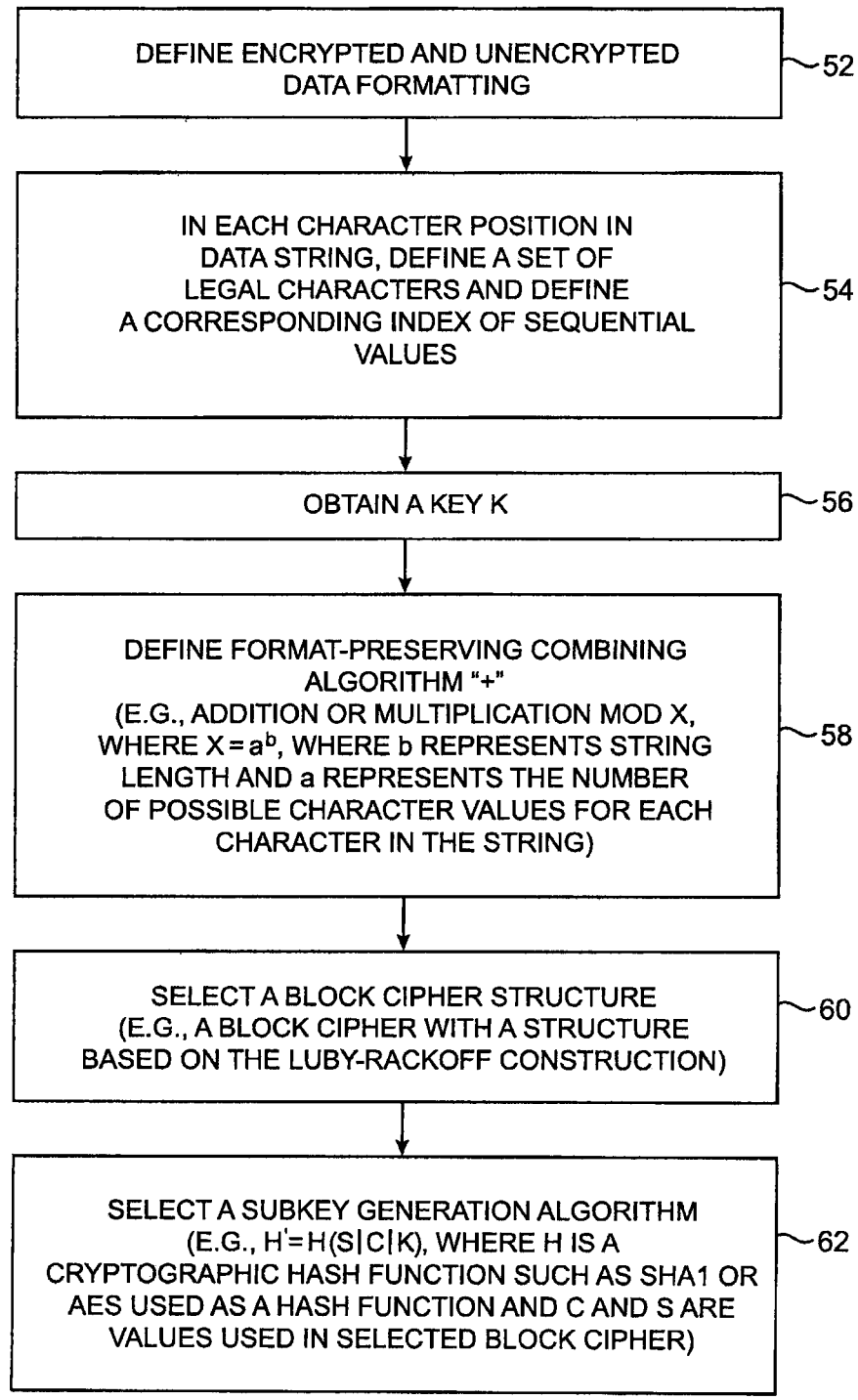
FIG. 4 is a flow chart of illustrative steps that may be used in setting up format-preserving encryption and decryption engines for use in a data processing system of the type shown in FIG. 1 in accordance with an embodiment of the present invention.

Illustrative steps involved in setting up the encryption engine 26 and decryption engine 28 are shown in FIG. 4. At step 52, the desired formatting to be used for the encrypted and decrypted strings is defined.

For example, unencrypted strings may be social security numbers that follow the format ddd-dd-dddd, where d is a digit from 0 to 9. The encryption engine 26 may produce corresponding encrypted strings with the identical format.

As another example, the string format may be dddd dddd dddd dddc, where d is a digit from 0 to 9 and where c is a checksum digit (a digit from 0 to 9). The block cipher may be applied to the leading 15 digits of the credit card number and a checksum value may be recomputed from the encrypted version of the leading 15 digits using the Luhn algorithm. Validity period information may be embedded into the checksum digit by adding a validity period index to the recomputed checksum value. The index may, as an example, specify that an index value of 1 corresponds to the year 2006, an index value of 2 corresponds to the year 2007, an index value of 3 corresponds to the year 2008, etc. If the recomputed checksum is 3 (as an example), and the validity period for the encryption operation is 2006, the index value of 1 (corresponding to year 2006) may be added to the checksum value of 3 to produce a checksum digit of 4 for the ciphertext. In this situation, the final version of the encrypted string has the form dddd dddd dddd dddc, where the value of c is 4. The overall encryption process implemented by the encryption engine 26 maintains the digit format of the string, because both the unencrypted and encrypted versions of the string contain 16 digits.

The inclusion of additional constraints on the format of the encrypted string may be necessary to ensure that the encrypted strings are fully compliant with legacy applications. During step 52, a user decides which of these ancillary constraints are to be included in the definition of the required format for the string.

At step 54, for each character in the string, an index mapping is created by defining a set of legal character values and a corresponding index of sequential values that is associated with the legal characters values. For example, if the legal characters for a particular character position in a string include the 10 digits (0 . . . 9) and the 26 lowercase letters (a . . . z), a suitable indexing scheme associates digits 0 through 9 with index values 1 through 10 and associates letters a through z with index values 11-36. In this index mapping, the index values that are created are all adjacent. Because there are no gaps in the indices, index value 10 is adjacent to index value 11 (in the present example). If the string contains more than one type of character, there will be more than one index mapping associated with the characters in the string.

At step 56, a value for key K is obtained. The value of K may be obtained, for example, by generating K from a root secret and other information using a key generation algorithm in key server 20.

At step 58, the format-preserving combining operation "+" is defined. As described in connection with FIG. 3, the format-preserving combining operation may be addition modulo x, multiplication modulo x, or any other suitable logical or arithmetic operation that preserves the format of the string when combining the string with a subkey and that is reversible.

At step 60, a block cipher structure is selected for the encryption engine 26 and decryption engine 28. The block cipher structure may, for example, by a Luby-Rackoff construction of the type described in connection with FIG. 3. Other suitable block cipher structures may be used if desired.

At step 62, a subkey generation algorithm is selected. Suitable subkey generation algorithms include those based on cryptographic hash functions such the SHA1 hash function and AES algorithm used as a hash function. Suitable subkey generation algorithms also include those built on cryptographic message authentication code functions such as AES-CMAC.

After performing the setup steps of FIG. 4, the encryption engine 26 and decryption engine 28 can be implemented in system 10 and sensitive data can be secured.

Figure 5:
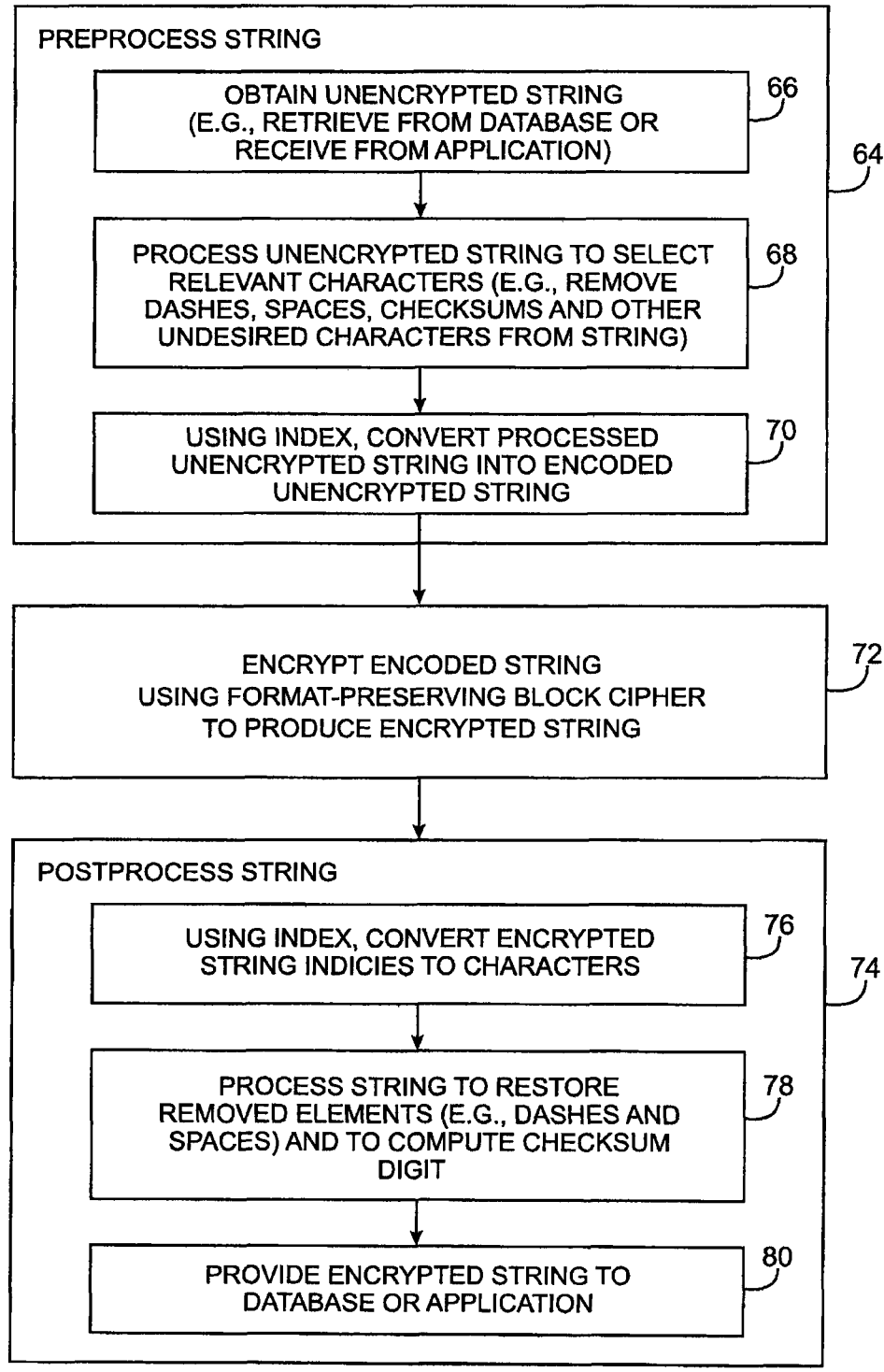
FIG. 5 is a flow chart of illustrative steps involved in using a format-preserving encryption engine to encrypt a data string in accordance with an embodiment of the present invention.
Figure 6:
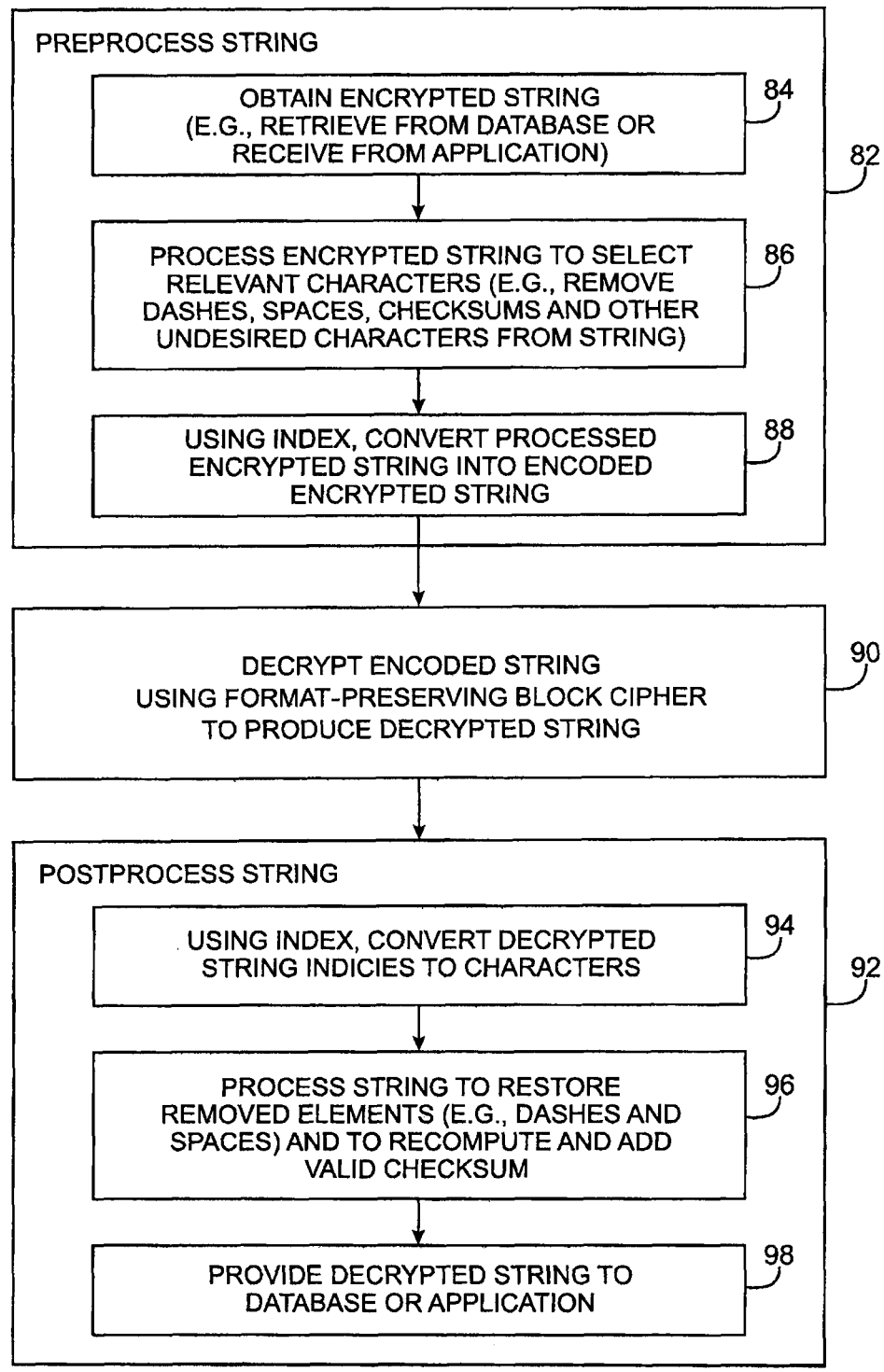
FIG. 6 is a flow chart of illustrative steps involved in using a format-preserving decryption engine to decrypt a data string in accordance with an embodiment of the present invention.

Illustrative steps involved in using the encryption engine 26 and decryption engine 28 when processing strings of data in system 10 are shown in FIGS. 5 and 6. As described in connection with FIGS. 1 and 2, the encryption engine 26 and decryption engine 28 may be called by an application or may be part of an application 16 that is running on data processing system 10. The data strings that are encrypted and decrypted may be strings that are retrieved from and stored in fields in a database 18 or may be strings that are passed between applications 16 (e.g., applications 16 that are running on the same computing equipment 12 or that are communicating remotely over a communications network 14).

The flow chart of FIG. 5 shows steps involved in encrypting a data string.

As shown in FIG. 5, the data string is preprocessed at step 64, encrypted at step 72, and postprocessed at step 74.

At step 66, the encryption engine obtains the unencrypted string. The string may be retrieved from a database 18 or received from an application 16.

At step 68, the string is processed to identify relevant characters. During step 68, dashes spaces, checksums, and other undesired characters can be removed from the string and the relevant characters in the string can be retained.

For example, if the string is a social security number that contains nine digits separated by two dashes, the string can be processed to remove the dashes. Although the dashes could be left in the string, there is no purpose in encrypting a dash character in the unencrypted string to produce a corresponding dash character in the encrypted string (as would be required to preserve the format of the entire string).

As another example, if the string being processed is a credit card number containing 16 digits and three spaces, the spaces can be removed. The checksum portion of the 16 digit credit card can be ignored by extracting the 15 leading digits of the credit card number as the relevant characters to be processed further.

At step 70, the encryption engine 26 uses the index mappings that were created during step 54 of FIG. 4 to convert the processed string (i.e., the string from which the irrelevant characters have been removed) into an encoded unencrypted string. For example, consider a license plate number in which the first, fifth, sixth, and seventh character positions contain digits (i.e., numbers from 0 through 9) and the second, third, and fourth character positions contain uppercase letters. An index mapping may be used to convert the character values in the first, fifth, sixth, and seventh character positions into corresponding index values ranging from 0 through 9. Another index mapping may be used to convert the character values in the second, third, and fourth character positions into corresponding index values ranging from 0 through 25. The index values used in each index mapping may be sequential. Once the characters have been encoded using the sequential index values, processing can continue at step 72.

At step 72, the encryption engine 26 encrypts the encoded string using the format-preserving block cipher that was established during the operations of FIG. 4. For example, the encryption engine 26 can perform the Luby-Rackoff encryption operations described in connection with FIG. 3. During step 72, the subkey generation algorithm that was selected at step 62 of FIG. 4 and the format-preserving combining algorithm + that was defined at step 58 of FIG. 4 are used to transform the unencrypted encoded string into an encrypted encoded string.

At step 76, the same index mappings that were used during the encoding operations of step 70 are used to convert the index values of the encrypted string back into characters (i.e., characters in the legal set of character values that were defined for each character position at step 54). Decoding the encoded version of the string using the index mappings returns the string to its original character set.

At step 78, the decoded encrypted string is processed to restore elements such as dashes and spaces that were removed at step 68. When replacing a checksum value, a new valid checksum value can be computed from the encrypted version of the string and validity period information or other suitable information can be embedded within the checksum digit (e.g., by adding a validity period index to the new valid checksum value to produce a checksum digit for the decoded encrypted string). The decoded encrypted string is ciphertext that corresponds to the plaintext unencrypted string that was obtained at step 66. If desired, the entire string can be encrypted. With this type of arrangement, the checksum removal operation of step 68 and the checksum digit computation operation of step 78 can be omitted.

By processing the string at step 78, the extraneous elements of the string that were removed at step 68 are inserted back into the string. Because the extraneous elements are reinserted into the string and because a format-preserving block cipher was used in step 72, the encrypted string that is produced will have the same format as the original unencrypted string. This allows the encrypted string to be used by applications 16 and databases 18 that require that the original string's format be used.

At step 80, the encrypted string is provided to an application 16 or database 18. Legacy applications and databases that require a specific string format may be able to accept the encrypted string.

Illustrative steps involved in using decryption engine 28 to decrypt a string that has been encrypted using the process of FIG. 5 are shown in FIG. 6. The decryption engine 28 may be invoked by an application 16 or may be part of an application 16 that is running on data processing system 10. The data string that is being decrypted in the process of FIG. 6 may be an encrypted string that has been retrieved from a database 18 or may be a string that has been retrieved from an application.

As shown in FIG. 6, the encrypted data string is preprocessed at step 82, is decrypted at step 90, and postprocessed at step 92.

At step 84, the decryption engine obtains the encrypted string. The encrypted string may be retrieved from a database 18 or received from an application 16.

At step 86, the encrypted string is processed to identify relevant characters. During step 86, dashes spaces, checksums, and other extraneous elements can be removed from the string. The relevant characters in the string are retained. The process of removing extraneous characters during step 86 is the same as that used during the processing of the unencrypted string that was performed during step 68 of FIG. 5.

If the string being decrypted is a social security number that contains nine digits separated by two dashes, the encrypted string can be processed to remove the dashes.

As another example, if the string being processed during step 86 is a credit card number containing 16 digits and three spaces, the spaces can be removed prior to decryption. The checksum digit of the 16 digit credit card can be ignored by extracting the 15 leading digits of the encrypted credit card number as the relevant characters to be decrypted. If information is embedded in the checksum digit (e.g., validity period information), the checksum digit may be processed to extract this information during step 86.

At step 88, the decryption engine 26 uses the index mappings that were defined at step 54 of FIG. 4 and that were used during the encryption operations of FIG. 5 to convert each of the characters of the processed encrypted string (i.e., the encrypted string from which the extraneous characters have been removed) into an encoded encrypted string. If, as an example, the legal set of characters associated with the first character of the encrypted string is defined as the set of 10 digits, a 10 digit index may be used to encode the first character of the encrypted string. If the legal set of characters associated with the second character of the encrypted string is defined as the set of 26 uppercase letters, a 26-digit index may be used to encode the second character of the encrypted string. During step 88, each character of the string is converted to a corresponding index value using an appropriate index mapping.

At step 90, the encoded version of the encrypted string is decrypted. The decryption engine 28 decrypts the string using the format-preserving block cipher that was established during the operations of FIG. 4. For example, the decryption engine 26 can perform the Luby-Rackoff decryption operations described in connection with FIG. 3. During step 90, the subkey generation algorithm that was selected at step 62 of FIG. 4 and the format-preserving combining algorithm + that was defined at step 58 of FIG. 4 are used to transform the encrypted encoded string into a decrypted encoded string.

At step 94, the index mappings that were used during the encoding operations of step 88 are used to convert the index values of the decrypted string back into their associated characters (i.e., characters in the legal set of character values that were defined for each character position at step 54). This returns the decrypted string to its original character set. In strings that contain more than one different type of character, multiple different index mappings are used.

At step 96, the decoded decrypted string is processed to restore elements such as dashes, spaces, and checksum values that were removed at step 88. When replacing a checksum value, a new valid checksum value may be computed from the decrypted version of the string. This ensures that the decrypted version of the string will be returned to its original valid state.

During the string processing operations of step 96, the extraneous elements of the string that were removed at step 88 are inserted back into the string. This restores the string to its original unencrypted state (i.e., the state of the string when obtained at step 66 of FIG. 5).

At step 98, the decrypted string is provided to an application 16 or database 18.

By incorporating format-preserving encryption and decryption engines 26 and 28 into data processing system 10, legacy applications and databases and other applications and databases can be provided with cryptographic capabilities without disrupting their normal operation.

The key K that is used by encryption and decryption engines 26 and 28 may be produced using any suitable technique. For example, key K may be supplied to key server 20 manually and may be distributed to encryption and decryption engines 26 and 28 in satisfaction of valid key requests. With one particularly suitable arrangement, key K is derived mathematically from a secret. The secret, which is sometimes referred to as a root secret, may be maintained at key server 20. The root secret may be supplied to key server 20 manually or may be produced using a pseudo-random number generator.

To ensure that keys are only distributed to authorized applications 16, it may be advantageous to mathematically compute each key K from policy information 22 (FIG. 1). As an example, key K may be computed by key server 20 using equation 5.

$$K = f(RSECRET, IDEN) \quad (5)$$

In equation 5, the parameter IDEN is an identifier, the parameter RSECRET is a root secret, and the function f is a one-way function such as a hash function. An example of a hash function that may be used for function f is the SHA1 hash function. If desired, other hash functions and one-way functions may be used for function f.

The identifier IDEN may include information that identifies an individual, a group, a policy, or an application. As an example, the identifier may be based on the name of an individual, the name of an organization, the name of a group, or any other suitable user name. The identifier may also be based on the name of a policy (e.g., "PCI" indicating that cryptographic operations should be performed in accordance with payment card industry standards) or may be based on the name of an application. When an application requests key K from key server 20, the key server 20 may use all or part of the value of IDEN in determining whether the key requester is authorized to receive K. If the key requester is authorized, the function of equation 5 may be used to generate K.

To support version-based functions in system 10, it may be desirable to allow identities and their associated keys K to expire. Identity and key expiration may be implemented by requiring that a validity period be included in each identity IDEN. The validity period indicates the dates on which the key K is valid. Validity periods can be expressed in terms of absolute dates, abbreviated dates, version numbers that relate to valid date ranges or key versions, etc.

One suitable format for the validity period is an expiration date. For example, a validity period for IDEN may be made up of a year of expiration (e.g., 2007), may be made up of a week of expiration (e.g., week number 45), may be made up of a month and year of expiration (e.g., 03/2007 or 03/07), etc. Validity periods may also be constructed using a date range (e.g., 2006-2007) during which key K is valid. With one suitable arrangement for use when encrypting and decrypting credit cards, the validity period in an identity IDEN may be a credit card expiration date (e.g., 05/08).

The credit card expiration date or other such information (e.g., a record locator, cardholder name, etc.) may be combined with information that labels the identity IDEN as being associated with credit cards and the payment card industry (PCI). The value of IDEN might be formed, for example, by combining the strings "Joe Smith" (the name of a holder of a credit card), "PCI" (indicating the payment card industry), and a credit card expiration date to form (as an example) a value for IDEN of "JOE_SMITH_PCI_05/08."

Figure 7A:
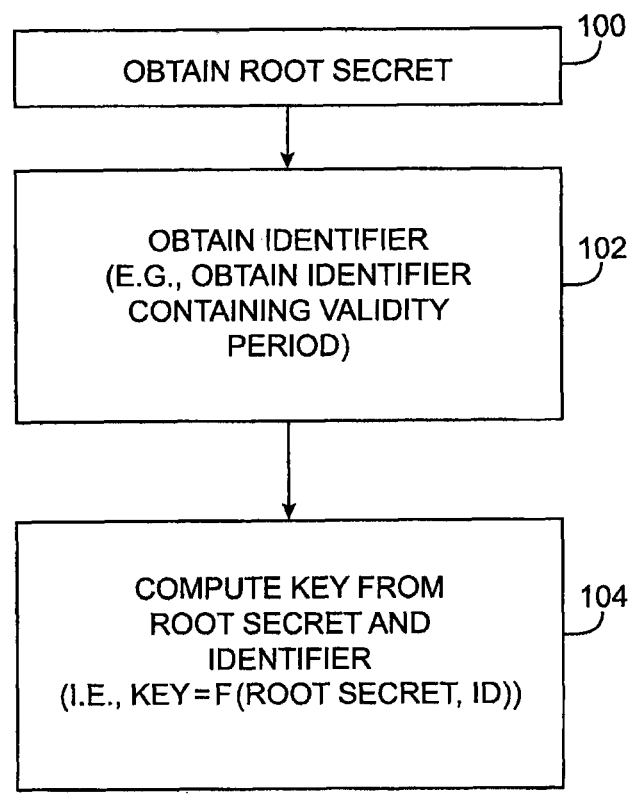
FIG. 7A is a flow chart of illustrative steps involved in generating a key that is based on an identifier in accordance with an embodiment of the present invention.

Illustrative steps involved in forming a key K using equation 5 are shown in FIG. 7A.

At step 100, key server 20 obtains the parameter RSECRET (e.g., using a pseudorandom number generator operating at key server 20, by retrieving RSECRET from a cache at key server 20, etc.).

At step 102, the key server 20 obtains the parameter IDEN. The parameter IDEN may be provided to key server 20 as part of a key request (e.g., in a single transmission requesting a key or in a series of related transmissions requesting a key). Information such as a user identity (e.g., a username or part of a username, a group identity, etc.), validity period (e.g., an expiration date, a valid date range, a version number, or a combination of such validity period information), and industry/key type (e.g., "PCI" for the payment card industry) may be included in the value of the IDEN string. If desired, components of the IDEN string may be represented using multiple strings or additional information may be included in the IDEN string.

At step 104, key server 20 may use function f of equation 5 (e.g., a SHA1 hash function or other one-way function) to compute K from the known values of the root secret RSECRET and the identifier IDEN.

Keys may be generated using the operations of FIG. 7A at any suitable time. For example, key server 20 may generate a key K whenever a valid key request is received. If desired, key server 20 may maintain a key cache in which previously generated keys are stored. Use of a key cache may reduce the processing burden on key server 20.

Figure 7B:
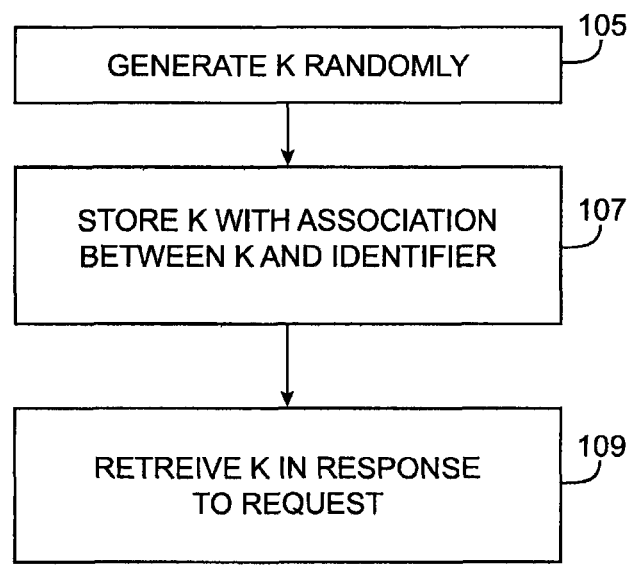
FIG. 7B is a flow chart of illustrative steps involved in generating a key and storing the generated key with an association between the stored key and an identifier in accordance with an embodiment of the present invention.

A flow chart of illustrative steps involved in generating key K using an approach in which generated key K is persistently stored is shown in FIG. 7B. With the approach of FIG. 7B, key K is generated randomly at step 105. For example, key K may be generated using a pseudorandom number generator at key server 20 when a key is requested in a key request containing an identifier IDEN.

At step 107, the key K is stored in persistent storage (e.g., a key cache maintained at key server 20). Key server 20 also stores an association between the key K that has been generated and the value of identifier IDEN from the key request. The association may be provided by making an entry in a database that contains the key and the related identifier IDEN (as an example). At a later time, when key K is requested, key server 20 can retrieve the correct key K from storage to satisfy the request using the value of the identifier IDEN that is provided in the key request (step 109). The approach of FIG. 7B therefore allows the key generator 20 to obtain the key K by generating the key K randomly (if no key value has been cached) or by retrieving a previously stored version of key K using the identity value IDEN.

Key server 20 also preferably maintains policy information 22 (FIG. 1). Policy information 22 includes policy rules that may be used in determining which key requests should be granted and which key requests should be denied. An example of a policy rule is a rule that requires that a key requester authenticate successfully as part of a PCI LDAP (Lightweight Directory Access Protocol) group whenever the parameter IDEN includes the industry type "PCI." As another example, a policy rule might specify that key requests should only be satisfied if made at date that falls within the validity period specified in the IDEN parameter. Key server 20 may maintain a clock or may otherwise obtain trustworthy external information on the current date. External information such as this may be used by key server 20 in evaluating whether the policy rules have been satisfied for a particular key request. In a typical scenario, the policy rules at key server 20 will specify multiple criteria that must be satisfied (e.g., proper authentication of a given type must be performed, a validity period restriction must be satisfied, etc.).

Figure 9:
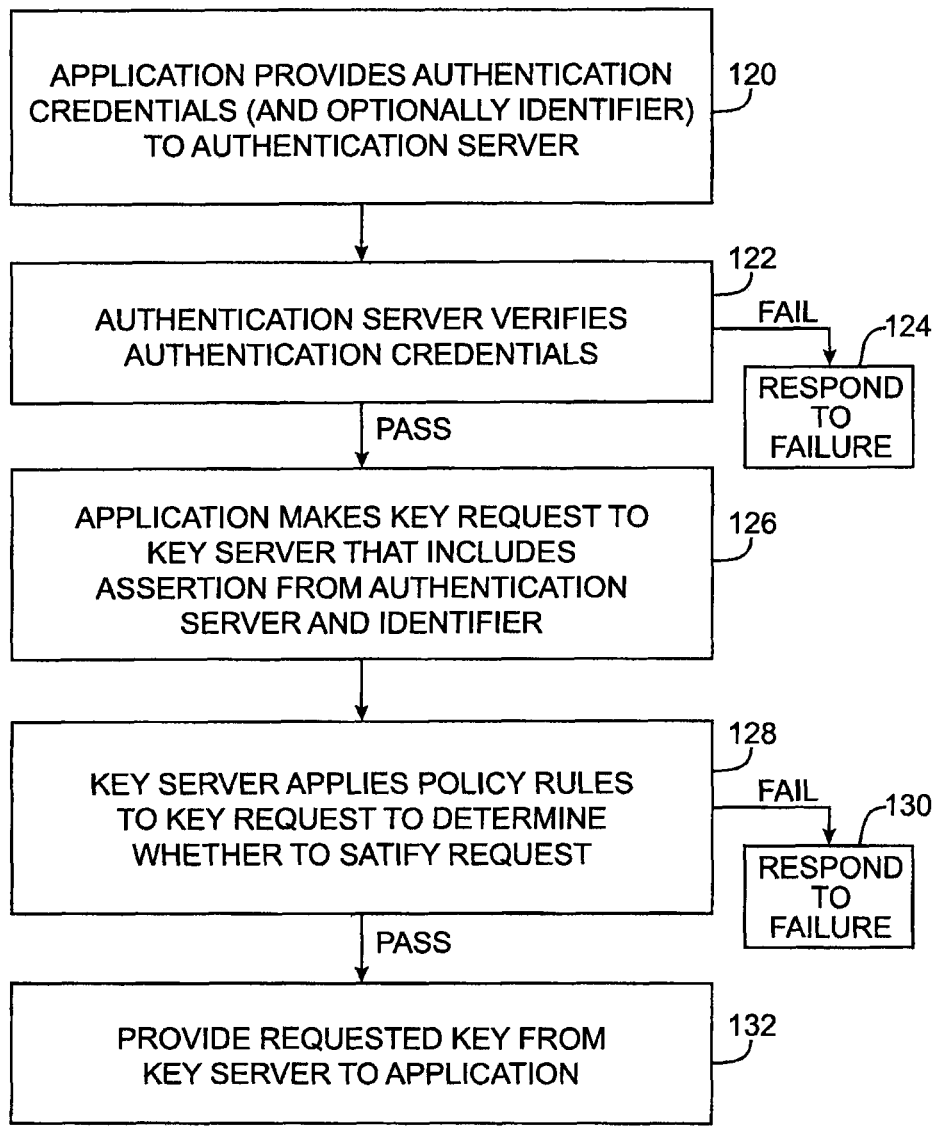
FIG. 9 is a flow chart of illustrative steps involved in requesting and obtaining a key from a key server in accordance with another embodiment of the present invention.
Figure 10:
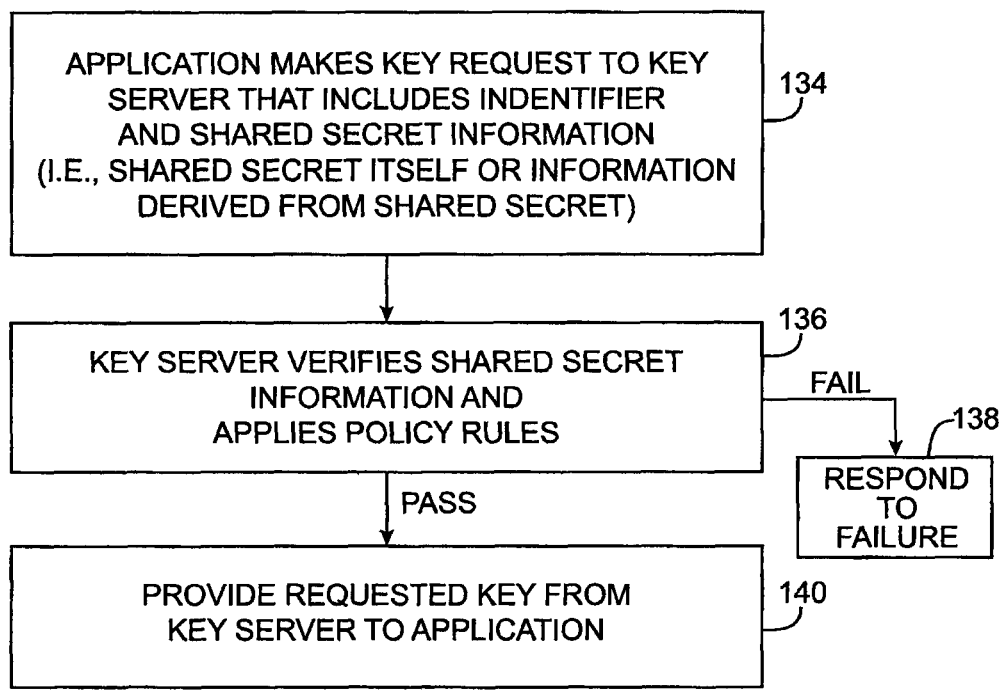
FIG. 10 is a flow chart of illustrative steps involved in requesting and obtaining a key from a key server in accordance with yet another embodiment of the present invention.

In some situations, authentication server 24 is used in authenticating key requesters. In other situations, key server 20 may perform authentication. Key requests may be made by encryption engine 26 when a copy of a key K is needed to perform an encryption operation or by decryption engine 28 when a copy of key K is needed to perform a decryption operation. In general, any suitable technique may be used to process key requests. Flow charts presenting three illustrative ways in which key requests for key K may be handled in system 10 are shown in FIGS. 8, 9, and 10.

Figure 8:
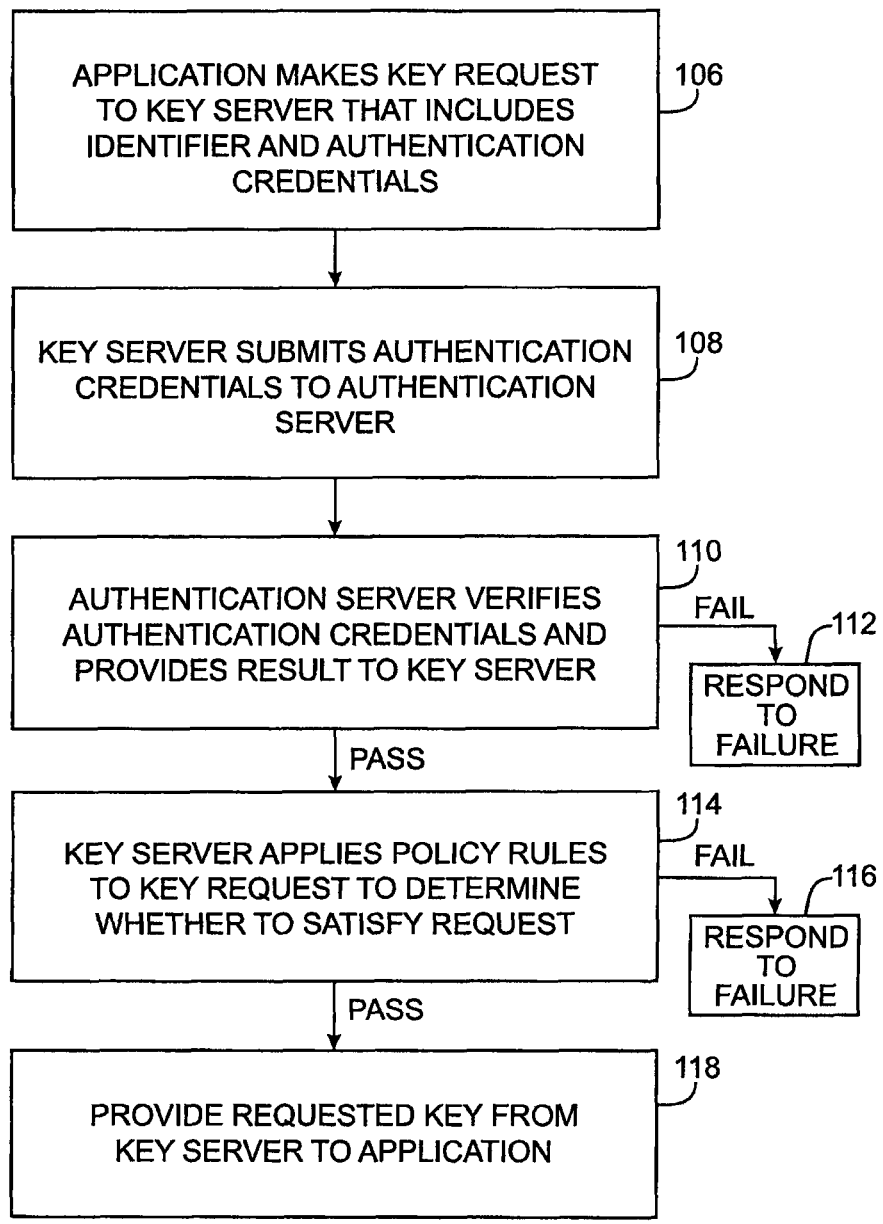
FIG. 8 is a flow chart of illustrative steps involved in requesting and obtaining a key from a key server in accordance with an embodiment of the present invention.

In the example of FIG. 8, an encryption engine or decryption engine associated with an application 16 makes a key request to key server 20 at step 106. Key requests such as the key request of step 106 may be made in a single transmission over network 14 between the computing equipment 12 on which the requesting application resides or may be made in multiple associated transmissions. The key request may include authentication credentials and an identifier such as the identifier parameter IDEN described in connection with FIGS. 7A and 7B. The identifier that is associated with the key request may include information such as a validity period (e.g., a credit card expiration date), user name, etc. Different types of keys may require different levels of authentication. The authentication credentials that are provided as part of the key request are preferably provided in a form that is suitable for the type of key being requested. One example of authentication credentials is a userID and password. Biometric authentication credentials may also be used (as an example).

At step 108, key server 20 forwards the authentication credentials that have been received from the key requester to authentication server 24 over communications network 14.

At step 110, authentication server 24 verifies the authentication credentials. For example, if the authentication credentials include a userID and password, authentication server 24 may compare the userID and password to a list of stored valid userIDs and passwords.

If the authentication server 24 determines that the authentication credentials are not valid, the authentication process fails. A suitable response to this failure may be generated at step 112. For example, authentication server 24 can notify key server 20 that the authentication credentials are not valid and can generate suitable alert messages for entities in system 10. Other suitable actions include generating an error message that prompts key server 20 and/or the key requester to resubmit the credentials (e.g., to avoid the possibility that the authentication failure was due to mistyped authentication credentials).

If the authentication server 24 determines that the authentication credentials are valid, the authentication server 24 notifies the key server 20 accordingly. In a typical scenario, the authentication server provides the key server 20 with an "assertion" indicating that the credentials are valid. The assertion may include information on group membership and roles and rights for the authenticated party.

At step 114, key server 20 applies policy rules 22 to the key request. Information such as the identity information IDEN, the authentication results from authentication server 24 (e.g., the assertion), and external information such as the current date may be used by the key server 20 in enforcing the policy rules.

As an example, identity information, authentication results, and external information may be used in determining which policy rules should be applied. Certain policy rules may be applied when IDEN indicates that the key requester is making a "PCI" key request. Such rules may, as an example, require a particular level of authentication. Certain policy rules may also be applied when a key request is made on particular times and dates (e.g., more stringent authentication may be required for evening and weekend key requests). Certain policy rules may apply to particular groups of users, etc.

In addition to determining which policy rules should be applied, key server 20 may also use identity information, authentication results, and external information in determining whether the applicable policy rules have been satisfied. For example, during step 114, key server 20 may determine whether the key request includes valid validity period information (e.g., whether an expiration period has expired). Key server 20 may also check to make sure that appropriate valid authentication results have been received from authentication server 24, may check the key requester's membership in a directory group, etc.

If the criteria set forth in the applicable policy rules are not satisfied, the key request fails and appropriate error notifications may be generated or other actions may be taken at step 116.

If the applicable policy rules are satisfied, key server 20 may generate a key K to satisfy the key request at step 118. The key K may be generated using operations of the type shown in FIG. 7A or may be generated or retrieved using operations of the type shown in FIG. 7B. The key K may then be supplied to the key requester over a secure path in communications network 14.

In this example, key server 20 applies the applicable policy rules to the key request following successful verification of the authentication credentials by authentication server 24. If desired, the policy rules can be applied between steps 106 and 108. In this type of scenario, the key server need not submit the authentication credentials to the authentication server if the policy rules are not satisfied (e.g., if validity period information indicates that an expiration date has passed).

Another illustrative technique that may be used by an encryption engine or decryption engine associated with an application to obtain key K is shown in FIG. 9. With this technique, authentication is performed using authentication server 24 before the key request is made to key server 20.

At step 120, an application 16 that desires a key K provides authentication credentials to authentication server 24 for verification. If desired, the application may also provide an identifier (e.g., parameter IDEN) to authentication server 24, which may use this information to determine what type of assertion to provide to the application following successful verification of the authentication credentials.

At step 122, authentication server 24 verifies the authentication credentials. If the authentication credentials are not valid, an appropriate response may be made at step 124 (e.g., by providing the application with another chance to provide valid credentials, by issuing an alert, etc.).

If the authentication credentials are determined to be valid, the authentication server provides the application with an assertion over communications network 14. The assertion may be, for example, a Kerberos ticket.

At step 126, the application uses the assertion that has been received from the authentication server in making a key request to key server 20. The key request may include the assertion from authentication server 24 and an identifier (e.g., parameter IDEN).

At step 128, the key server applies policy rules 22 to the key request to determine whether the key request should be satisfied. Key server 20 may use identity information (e.g., parameter IDEN, which may include a validity period), authentication results (e.g., the assertion), and external information (e.g., the current date) in determining which policy rules should be applied to the key request. The key server may also use this information in determining whether the applicable policy rules have been satisfied. As an example, key server 20 may determine whether the key request includes valid validity period information during step 128 and may check to determine whether the assertion is valid and sufficient to satisfy the policy rules.

If the applicable policy rules are not satisfied, the key server 20 may request that the application issue a new request or may take other suitable actions in response to the failure (step 130).

If the key server determines that the applicable key access policy rules have been satisfied, the key server may retrieve key K from cache or may generate an appropriate key K, as discussed in connection with FIGS. 7A and 7B. At step 132, the key K may be provided from key server 20 to the requesting application over communications network 14.

With the approach of FIG. 10, authentication operations are performed by key server 20, so authentication server 24 need not be used.

At step 134, an application that needs key K makes a key request to key server 20. The key request may include an identifier (e.g., parameter IDEN) and shared secret information. The shared secret information may be, for example, a shared secret (i.e., a secret known by the application and by the key server) or shared secret information that is derived from the shared secret (e.g., by hashing the shared secret with an identifier such as parameter IDEN).

At step 136, the key server verifies the shared secret information. The key server may, as an example, compare the shared secret information from the key request to previously generated and stored shared secret information or to shared secret information that is generated in real time based on the received identity (e.g., IDEN). If the shared secret information is valid, the key server can determine which key access policy rules are to be applied to the key request (e.g., using external information such as the current date, using identity information IDEN, etc.). After determining which policy rules to use, key server 20 applies the appropriate policy rules to the key request.

If the criteria set forth in the policy rules are not satisfied, the key request fails and appropriate actions can be taken at step 138.

If the policy rules are satisfied, the key server can retrieve key K from cache or may generate key K in real time (e.g., using the operations of FIGS. 7A and 7B). The requested key may then be provided to the key requester over communications network 12 (step 140).

One of the potential advantages of using key server 20 is that it helps to avoid problems that might otherwise arise when storing keys in local cache on computing equipment 12. If keys are only maintained in local storage, it may be difficult to recreate a key when needed to resurrect a server that has crashed. By using key server 20, keys can be regenerated as needed at the key server.

Systems such as system 10 of FIG. 1 may use validity periods to control when keys are valid. A first application may encrypt plaintext using a cryptographic key that is based on a given validity period. The resulting ciphertext may then be stored in a database and retrieved by a second application or may be provided directly to the second application over network 14. The second application must obtain a copy of key K to decrypt the ciphertext. The key K must be generated using the given validity period. If an incorrect validity period is used in generating K, the value of K will be incorrect and the second application will not be able to use that value of K to decrypt the ciphertext.

To ensure that applications are properly informed of which validity period to use when processing a given data item, the validity period can be embedded in the data item. When an application needs to determine what validity period applies to a particular data item, the validity period can be extracted from the data item by the application.

Consider, as an example, credit card numbers. The last digit of a credit card number is a checksum digit. In a normal valid credit card number, the value of the checksum digit represents a valid checksum that is computed based on the preceding numbers of the credit card (i.e., the sixteenth digit in a credit card number is a checksum digit computed from the first fifteen digits of the credit card number). The checksum digit can be used to determine whether a given credit card number is valid.

Validity period information can be embedded in the credit card number by adding a validity period index to the checksum. With one suitable arrangement, the validity period index matches index values 1 through 9 with years 2006, 2007, ... 2014, respectively. The validity period index value for 2006 is 1, the validity period index value of 2 represents a validity period of 2007, etc. By combining an appropriate validity period index with a checksum number, the validity period can be embedded into the checksum digit and therefore into the credit card number.

Figure 11:
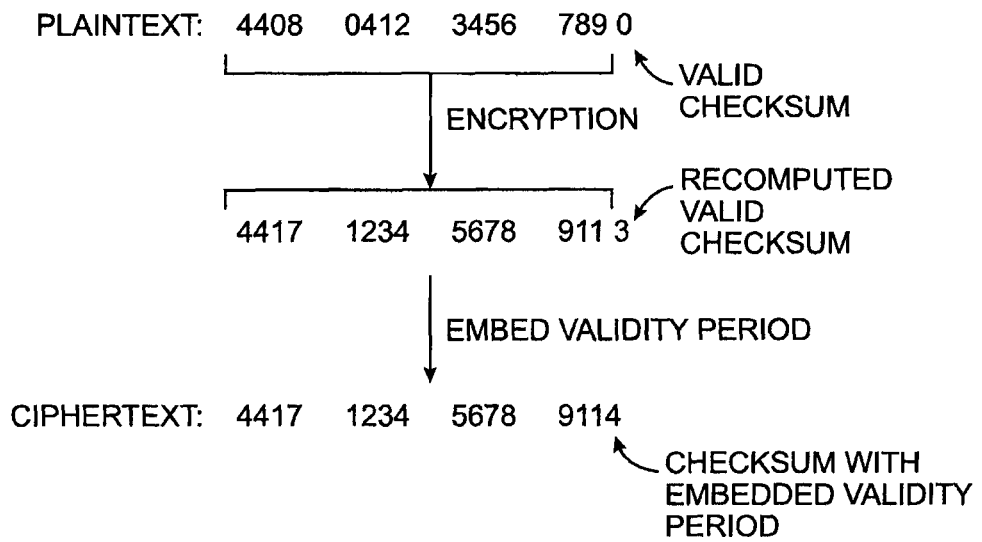
FIG. 11 is a diagram showing how validity period information can be embedded within a credit card number during format-preserving encryption operations in accordance with an embodiment of the present invention.

Validity period embedding is illustrated in FIG. 11. In the example of FIG. 11, the valid checksum digit for an unencrypted credit card (plaintext) is 0. Following application of a format-preserving encryption function, the first 15 digits of the credit card number are transformed into encrypted digits. A new valid checksum can be computed based on these encrypted digits. In the example of FIG. 11, the recomputed valid checksum is 3. The validity period that is to be embedded into the checksum digit is 2006 (in this example). The index value for validity period 2006 is 1.

As shown in FIG. 11, the validity period can be embedded into the checksum digit by adding 1 (the index value for 2006) to 3 (the checksum). The resulting modified checksum digit will be 4. When this modified checksum digit is used in the ciphertext version of the credit card number, it will not represent a valid checksum for the ciphertext version of the credit card number. However, applications will be able to extract the validity period from the ciphertext, obviating the need to keep track of the validity period separately.

Figure 12:
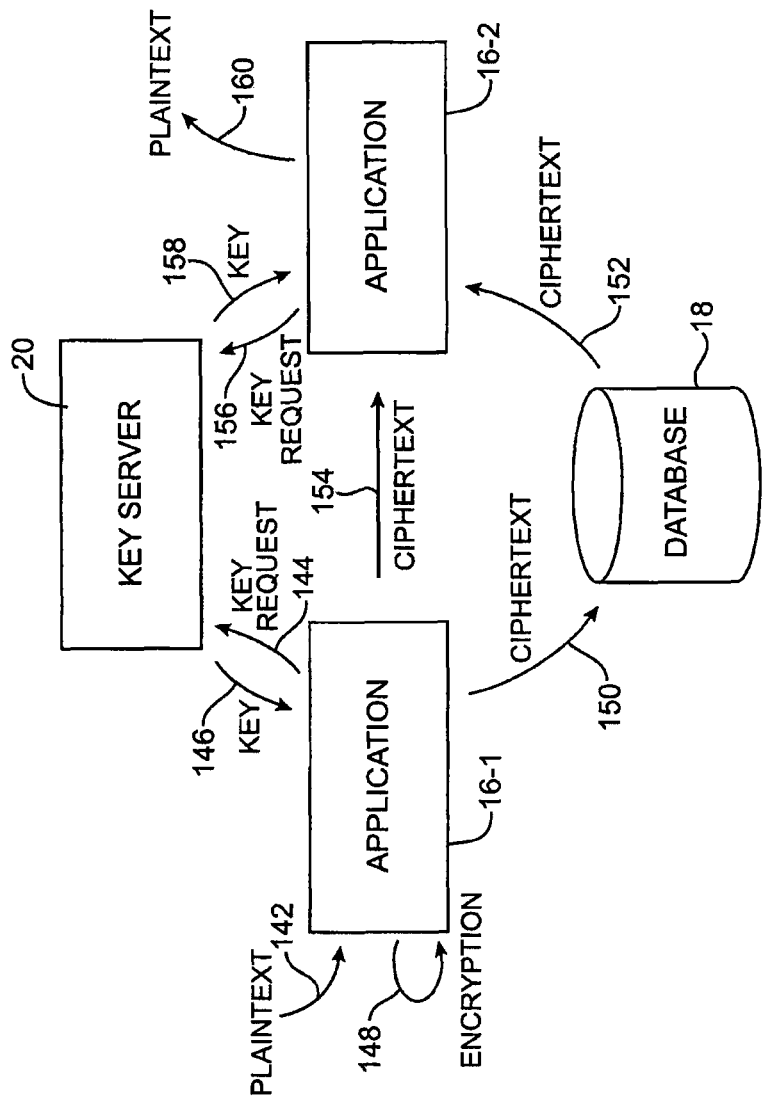
FIG. 12 is a diagram of an illustrative system in which format-preserving encryption and decryption operations are performed in accordance with an embodiment of the present invention.

FIG. 12 is a diagram showing how a credit card numbering scheme with embedded validity period information may be implemented in a system such as system 10 of FIG. 1. As shown by line 142, a first application 16-1 may receive plaintext such as a credit card number. The plaintext may be manually input into application 16-1 by an operator, may be received from another application, etc.

Application 16-1 encrypts the plaintext to form ciphertext. As indicated by line 144, application 16-1 may request a copy of a key K from key server 20. If application 16-1 is authorized, key server 20 will provide the requested key K to application 16-1 (line 146). Application 16-1 encrypts the plaintext using encryption engine 26 and key K (line 148) to produce ciphertext. As part of the encryption operation, application 16-1 can embed validity period information into the ciphertext.

Application 16-1 can store the ciphertext in database 18 for subsequent retrieval by application 16-2 (lines 150 and 152). Alternatively, application 16-1 can provide the ciphertext to application 16-2 directly (line 154). Application 16-2 extracts the validity period information from the ciphertext and uses this validity period information in requesting an appropriate key K for decrypting the ciphertext (line 156). If authorized, key server 20 provides the requested key to application 16-2 (line 158). The key is used in decryption engine 28 by application 16-2 to decrypt the ciphertext, producing plaintext (line 160). The plaintext may be used by application 16-2 or other applications in system 10 to which application 16-2 provides the plaintext.

Figure 13:
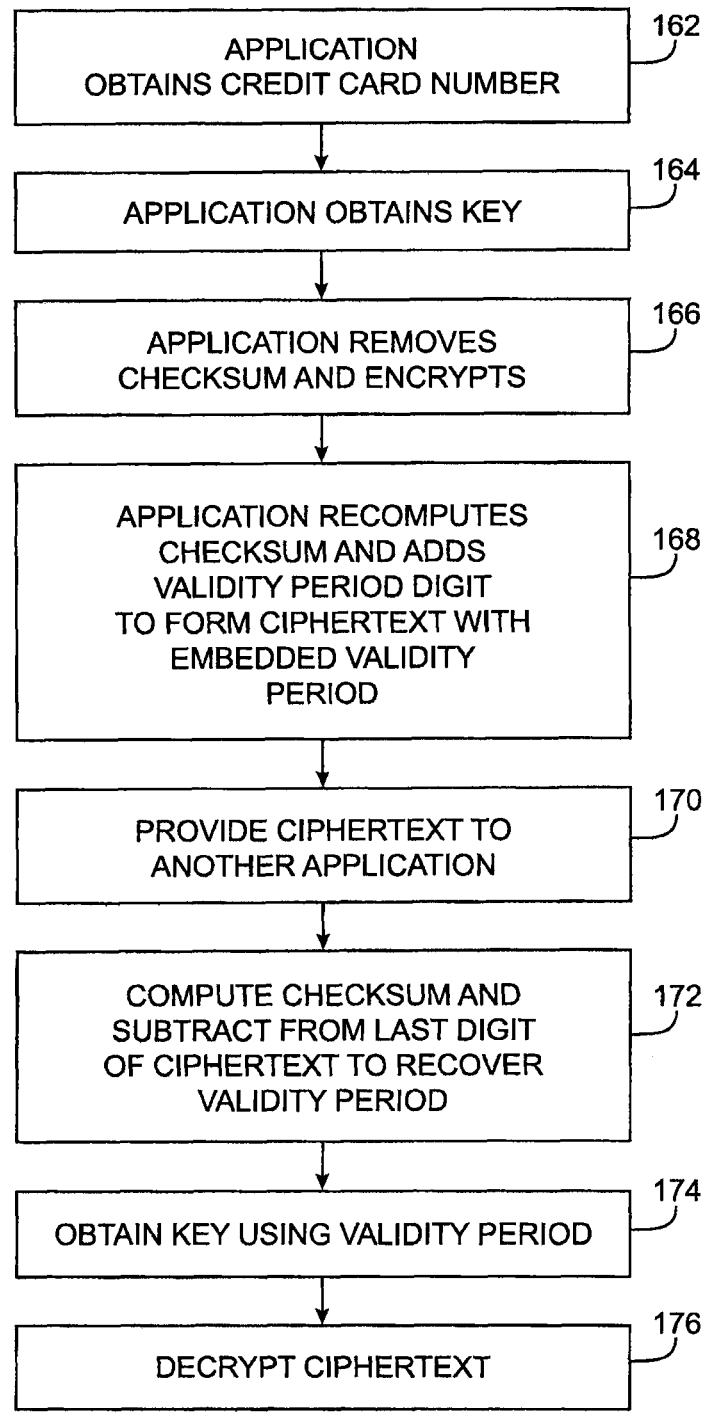
FIG. 13 is a flow chart of illustrative steps involved with encrypting and decrypting a credit card number using format-preserving cryptographic techniques in which validity period information is embedded in the checksum digit of the credit card number in accordance with an embodiment of the present invention.

Illustrative steps involved in encrypting and decrypting credit card numbers in an arrangement of the type shown in FIG. 12 in which validity period information is embedded in credit card checksum digits are shown in FIG. 13.

At step 162 of FIG. 13, application 16-1 obtains an unencrypted (plaintext) credit card number. The credit card number has a valid checksum digit (e.g., the 16th digit out of 16 digits in the credit card number).

An encryption engine 26 associated with application 16-1 requires a key K to encrypt the credit card number. The application 16-1 therefore obtains a key K (step 164). Suitable techniques for obtaining key K are described in connection with FIGS. 8, 9, and 10. With one suitable arrangement, application 16-1 provides key server 20 with a key request that contains an identity IDEN containing a validity period. Key server 20 may generate key K using equation 5.

At step 166, application 16-1 (e.g., encryption engine 26 at application 16-1) removes the original checksum from the plaintext (e.g., to produce a 15 digit string) and encrypts the string from which the checksum digit has been removed using a format-preserving encryption function of the type described in connection with FIG. 3. The format-preserving encryption operation uses the key K and the 15-digit string (number) as inputs and produces an encrypted 15-digit string (number) as an output (in this example).

At step 168, the application 16-1 (e.g., encryption engine 26) computes a new valid checksum from the 15-digit encrypted string. The application 16-1 then embeds validity period information in the checksum digit. Any suitable technique may be used to mathematically combine the validity period information and the valid checksum. With one suitable approach, a validity period index is created (e.g., an index value of 1 corresponding to a validity period of 2006, etc.) and this validity period index value is added to the checksum to produce a checksum digit into which the validity period information has been embedded. If desired, other suitable mathematical functions may be used to embed the validity period information into the checksum (or into other redundant information in a string). The ciphertext that results from the processing of step 168 includes a leading 15 digits of encrypted credit card data followed by a single checksum digit into which the validity period information has been embedded.

At step 170, the ciphertext is provided from application 16-1 to application 16-2 through a database 18 or direct transfer.

At step 172, application 16-2 receives the ciphertext version of the credit card number. Application 16-2 separates the portion of the ciphertext that does not include the embedded validity period from the ciphertext (e.g., application 16-2 separates the leading 15 digits of the ciphertext from the checksum digit). Application 16-2 computes a valid checksum for the leading 15 digits. Application 16-2 uses the newly computed valid checksum to extract the validity period from the checksum digit. The mathematical function that is used to extract the validity period reverses the embedding process used at step 168. For example, if the validity period was embedded into the checksum digit by adding the validity period to the checksum at step 168, application 16-2 subtracts the newly computed valid checksum from the checksum digit at step 172 to reveal the embedded validity period index value.

At step 174, application 16-2 uses the validity period that has been extracted from the checksum digit in obtaining a copy of key K. In particular, application 16-2 may formulate a key request for key server 20 that includes the extracted validity period. If application 16-2 is authorized, key server 20 may use the validity period in generating the key K (see, e.g., equation 5) and may provide the requested key K to application 16-2.

At step 176, application 16-2 may use decryption engine 28 to decrypt the ciphertext. Decryption engine 28 uses the key K and the ciphertext as inputs and produces the original plaintext version of the credit card number as an output. During decryption, decryption engine 28 may apply a format-preserving decryption algorithm of the type described in connection with FIG. 3 to decrypt the first 15 digits of the ciphertext version of the credit card to produce 15 corresponding plaintext credit card digits. The decryption engine 28 may also compute a valid checksum for the 15 decrypted digits and may append the valid checksum to the 15 decrypted digits to produce a complete 16-digit plaintext credit card number having a valid checksum.

The format-preserving cryptographic functions of encryption engine 26 and decryption engine 28 may be used to facilitate software testing.

Figure 14:
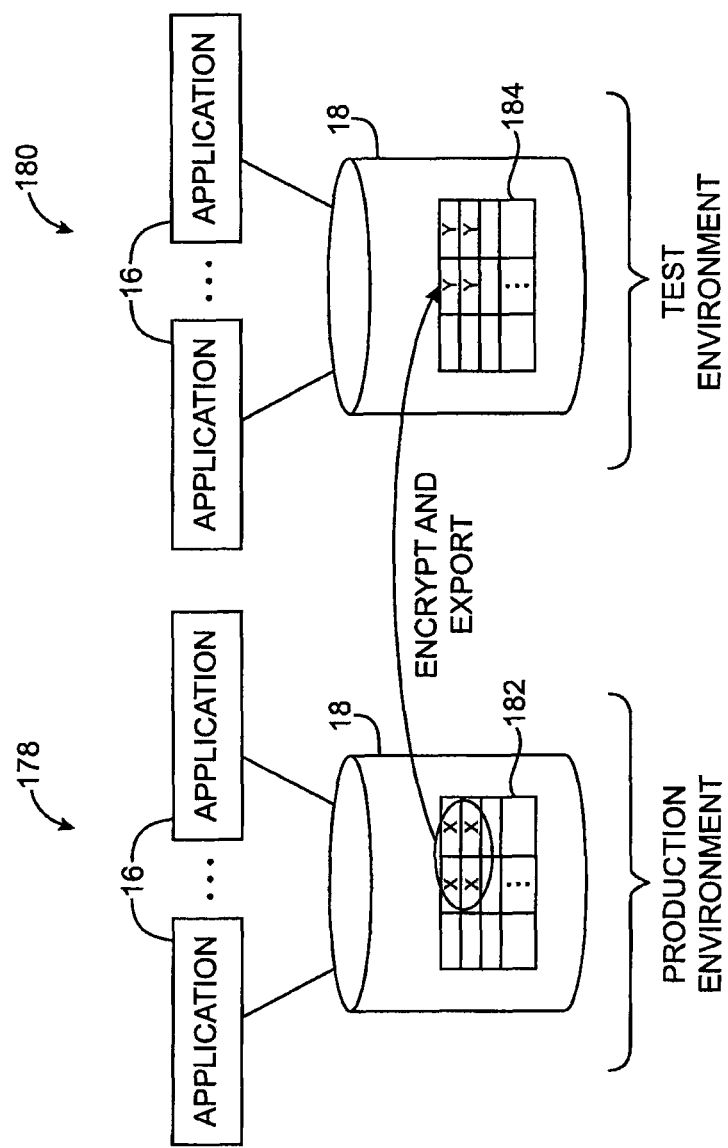
FIG. 14 is a diagram showing how a format-preserving encryption engine may be used to encrypt data before the data is exported from a production database in a production environment to a test database in a test environment in accordance with an embodiment of the present invention.

As shown in FIG. 14, a typical production environment 178 has multiple applications 16 that access a common database 18. During normal use of applications 16 in a production system, applications 16 access data 182. Data 182 may be provided in the form of one or more tables, some of which may contain sensitive data items (e.g., credit card numbers, etc.).

Before applications such as applications 16 are released into general use in production environment 178, testing is performed in a test environment 180. As shown in FIG. 14, the system of test environment 180 has applications 16 and a database 18 that are similar to those in production environment 178. Data 184 (e.g., tables of data of the type stored in database 18 in production environment 178) is stored in database 18 of test environment 180. However, the data 184 in test environment 180 is generally less secure than the data 182 in production environment 178. This is because test environments typically lack the sophisticated security measures (strong firewalls, up-to-date antivirus software, etc.) that are found in production environments.

Although test environments such as test environment 180 are often less secure than normal production environments such as environment 178, it is generally desired to test the applications 16 in test environment 180 using realistic data (e.g., credit card numbers and other data items that have appropriate string lengths and character values characteristic of valid real data). With conventional testing arrangements, a test environment database is created by copying a production environment database. This may expose sensitive information such as credit card numbers to attacks in the test environment.

To ensure that sensitive data is not exposed to attacks, format preserving encryption engine 26 is used to encrypt the data in table 182. The encrypted data 184 may be exported to a database in test environment 180. Any suitable amount of data may be encrypted and exported in this way. For example, the entire contents of database 18 in production environment 18 may be encrypted prior to exporting the encrypted data to database 18 in test environment 180. If desired, only sensitive data may be encrypted (e.g., credit card numbers and social security number), while less sensitive data is not encrypted (or is encrypted or obscured using less sophisticated techniques).

The encrypted data may be encrypted on a field-by-field basis. For example, credit card fields in the production database may be individually encrypted using format-preserving encryption engine 26 to produce encrypted credit card numbers in the test database. Because the encrypted credit card numbers have the same format as the unencrypted credit card numbers, accurate testing of applications 16 and database 18 can be performed in test environment 180. Because sensitive information is encrypted before it is exported to the test environment, the risk of exposing sensitive data to attackers in the test environment is significantly reduced.

Figure 15:
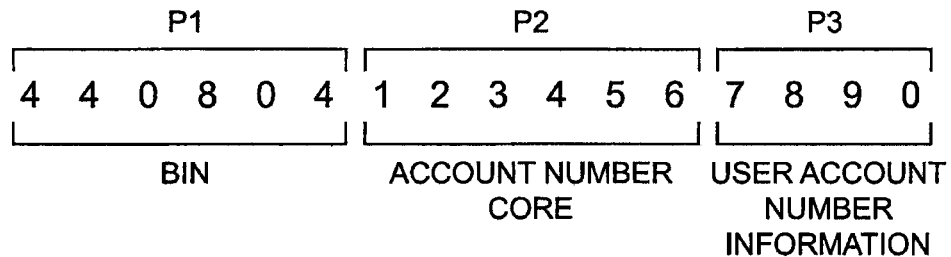
FIG. 15 is a diagram showing how different parts of a data item such as a credit card number can be divided into different plaintext parts for selective encryption in accordance with an embodiment of the present invention.

It may be desirable to selectively grant applications access to different parts of a data string. Consider the example of a credit card number. As shown in FIG. 15, a sixteen digit credit card number may include three parts. The leading six digits of the credit card number (plaintext part P1) are sometimes referred to as the bank identification number (BIN). The next six digits of the credit card number (plaintext part P2) are sometimes referred to as the account number core and form part of the credit card holder's account number. The last four digits of the credit card number (plaintext part P3) are sometimes referred to as user account number information and are used with the account number core to identify a credit card holder's account.

Different parties may be entitled to access different parts of the credit card number. Some parties may only need access to the BIN. Other parties may require access to the entire credit card number. As a result, it may be desirable to selectively grant access to different portions of the credit card number to different parties.

Figure 16:
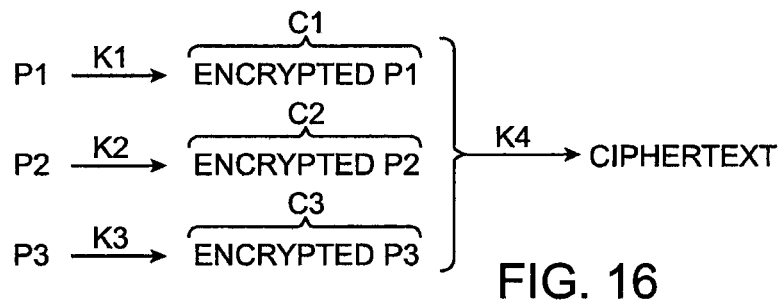
FIG. 16 is a diagram showing how three plaintext parts of a data string can be encrypted using four cryptographic keys in accordance with an embodiment of the present invention.

As shown in FIG. 16, selective access may be accomplished by using encryption engine 26 to encrypt part P1 with key K1, producing encrypted part P1 (ciphertext C1). Encryption engine 26 may encrypt part P2 with key K2 to produce encrypted part P2 (ciphertext C2). Part P3 may be encrypted with the encryption engine using key K3, producing encrypted part P3 (ciphertext C3). Encryption engine 26 may then be used to encrypt C1, C2, and C3 together using key K4 to produce credit card ciphertext (i.e., ciphertext for all of parts P1, P2, and P3 together). Keys K1, K2, K3, and K4 may be four independent cryptographic keys. Encryption with key K4 helps to prevent matching attacks (e.g., attacks in which an attacker attempts to gather information on the unencrypted credit card numbers by noting when values of C2 are identical for two different credit card numbers). Selective decryption may be performed by decrypting the ciphertext with key K4 and then decrypting a selected one of C1, C2, and C3 using an appropriate one of K1, K2, and K3.

In some situations, it may be desirable to grant different parties or applications with access to portions of a data string (e.g., P1, P2, and P3 in the present example) according to their sensitivity. In a credit card number, part P1 is considered less sensitive than part P2 and part P2 is considered less sensitive than part P3. Parts P1, P2, and P3 can therefore be ranked according to their sensitivity, with P1 being the least sensitive and with P3 being the most sensitive.

Figure 17:
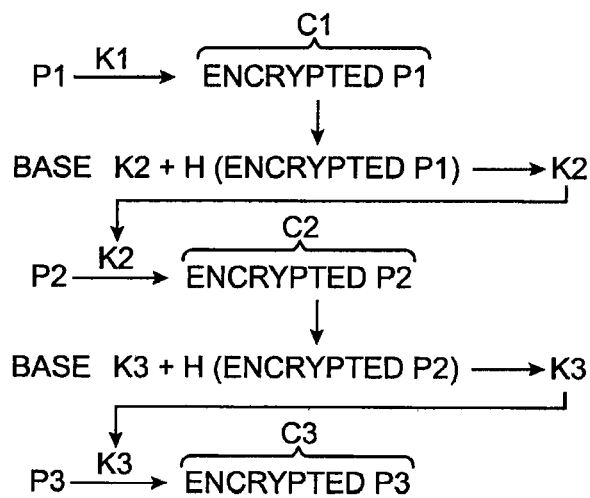
FIG. 17 is a diagram showing how three plaintext parts of a data string can be encrypted using three cryptographic keys in accordance with an embodiment of the present invention.

With one suitable encryption scheme, which is shown in FIG. 17, plaintext part P1 is encrypted first. With this scheme, encryption engine 26 uses a key K1 to produce encrypted P1 (ciphertext C1). Engine 26 uses a one-way function H such as a hash function (e.g., SHA1) to compute H(C1), which is combined with a key BASE K2 to produce a key K2. The function + in FIG. 17 represents any suitable combining function such as concatenation or addition. The key K2 is used to encrypt plaintext part P2, producing encrypted part P2 (ciphertext C2). This randomizes P2 relative to P1. Once C2 has been computed, engine 26 may compute H(C2) and may combine H(C2) with key BASE K3 to produce key K3. Engine 26 may then use key K3 to encrypt plaintext part P3. This produces ciphertext C3 and randomizes P3 relative to parts P1 and P2.

When it is desired to provide access to part P1 without providing access to part P2, an application may be provided with key K1, but not keys K2 and K3. Selective access to part P2 can be granted by providing an application with key K2. Key K3 can be provided to an application that desires selective access to part P3. Encryption can be provided using only three encryption operations, rather than the four encryption operations used in the approach of FIG. 16. Moreover, decryption of any given part can be performed in a single step, rather than using two steps. To produce P1, it is only necessary to decrypt C1 with K1. Similarly, decryption engine 28 can produce P2 by decrypting C2 with K2 and can produce P3 by decrypting C3 with K3.

With the technique of FIG. 17, matching attacks on part P1 are accepted, which is possible because the BIN number portion of a credit card number is not generally considered highly sensitive. Parts P2 and P3, which are more sensitive than part P1, are secure against matching attacks.

The foregoing is merely illustrative of the principles of this invention and various modifications can be made by those skilled in the art without departing from the scope and spirit of the invention.

What is claimed is:

1. A method for performing decryption at computing equipment in a data processing system that has a key server, the method comprising:

at the computing equipment, obtaining ciphertext;

with the computing equipment, providing, to the key server, a key request that includes an identifier;

at the key server, selecting policy rules to apply to the key request based at least partly on whether the identifier includes a label indicating that the ciphertext is associated with a type of data used for payments;

at the key server, applying the selected policy rules to determine whether to fulfill the key request;

when the selected policy rules are satisfied, generating a key at the key server in fulfillment of the key request using a one-way function that accepts a root secret and the identifier as inputs;

at the key server, transmitting the key;

at the computing equipment, receiving the key; and with a format-preserving decryption algorithm implemented on the computing equipment, decrypting the ciphertext using the key.

2. The method defined in claim 1 wherein generating the key comprises applying a hash function to the root secret and the identifier.

3. The method defined in claim 1 wherein the identifier includes a credit card expiration date and wherein generating the key comprises applying the one-way function to the root secret and the identifier that includes the credit card expiration date.

4. The method defined in claim 1 wherein the identifier includes a cardholder name and wherein generating the key comprises applying the one-way function to the root secret and the identifier that includes the cardholder name.

5. The method defined in claim 1 wherein the identifier includes a policy name and wherein generating the key comprises applying a hash function to the root secret and the identifier that includes the policy name.

6. The method defined in claim 1 wherein the identifier includes a validity period and wherein generating the key comprises applying the one-way function to the root secret and the identifier that includes the validity period.

7. The method defined in claim 1 further comprising:
supplying authentication credentials to the key server from the computing equipment;
at the key server, providing the authentication credentials to an authentication server;
at the authentication server, verifying the authentication credentials and providing authentication results to the key server; and
at the key server, generating the key only when the authentication results indicate that the authentication credentials are valid.

8. The method defined in claim 1 further comprising:
supplying authentication credentials to an authentication server from the computing equipment;
receiving an assertion from the authentication server at the computing equipment when the authentication credentials have been verified successfully at the authentication server; and
providing the assertion to the key server from the computing equipment as part of the key request, wherein applying the selected policy rules at the key server to determine whether to fulfill the key request comprises verifying whether the assertion is valid and sufficient to satisfy the selected policy rules.

9. The method defined in claim 1 further comprising:
at the key server, determining whether to fulfill the key request based at least partly on analyzing shared secret information, wherein the shared secret information is based on secret information that is shared between the key server and the computing equipment.

10. The method defined in claim 1, wherein the type of data used for payments comprises credit card number data and wherein selecting the policy rules to apply to the key request further comprises selecting the policy rules based on whether the label indicates that the ciphertext includes a credit card number.

11. The method defined in claim 10, wherein when the identifier in the key request comprises a card holder name associated with the credit card number, a credit card expiration date associated with the credit card number, and the label indicating that the ciphertext includes a credit card number, the key server selects the policy rules based on the card holder name, the credit card expiration date, and the label that indicates that the ciphertext includes the credit card number.

12. The method defined in claim 11, further comprising:
with the computing equipment, generating the identifier in the key request as a data string that combines the credit card number, the credit card expiration date, and the label that indicates that the ciphertext includes the credit card number.

13. The method defined in claim 1, wherein selecting the policy rules to apply to the key request comprises selecting a first policy rule when the identifier includes the label indicating that the ciphertext is associated with the type of data used for payments and selecting a second policy rule that is different from the first policy rule when the identifier does not include the label indicating that the ciphertext is associated with the type of data used for payments.

14. The method defined in claim 1, wherein selecting the policy rules to apply to the key request comprises selecting a rule that requires that a key requester authenticate as part of a payment card industry Lightweight Directory Access Protocol (LDAP) group when the identifier identifies that the ciphertext is associated with a payment card industry.

15. A method for performing decryption at computing equipment in a data processing system that has a key server, the method comprising:
at the computing equipment, obtaining ciphertext;
with the computing equipment, providing, to the key server, a key request that includes an identifier;
at the key server, selecting a first policy rule to apply to the key request when the identifier includes a label that identifies that the ciphertext includes a credit card number;
at the key server, selecting a second policy rule, which is different from the first policy rule, to apply to the key request when the identifier does not include the label that identifies that the ciphertext includes the credit card number;
at the key server, applying the first selected policy rule to determine whether to fulfill the key request when the identifier includes the label that identifies that the ciphertext includes the credit card number;
at the key server, applying the second selected policy rule to determine whether to fulfill the key request when the identifier includes the label that identifies that the ciphertext includes the credit card number;
when one of the first and second selected policy rules is satisfied, obtaining a key at the key server in fulfillment of the key request;
at the key server, transmitting the key;
at the computing equipment, receiving the key; and
with a format-preserving decryption algorithm implemented on the computing equipment, decrypting the ciphertext using the key.

16. The method defined in claim 15 wherein the identifier includes a credit card expiration date and wherein obtaining the key comprises retrieving the key from storage using the identifier that includes the credit card expiration date.

17. The method defined in claim 15, wherein selecting the first policy rule comprises selecting a rule that requires that a key requester authenticate as part of a payment card industry Lightweight Directory Access Protocol (LDAP) group.

* * * * *